(12) United States Patent
Sayarshad et al.

(10) Patent No.: US 11,250,363 B2
(45) Date of Patent: Feb. 15, 2022

(54) RESOURCE ALLOCATION USING SCALABLE NON-MYOPIC ATOMIC GAME FOR SMART PARKING AND OTHER APPLICATIONS

(71) Applicant: Cornell University, Ithaca, NY (US)

(72) Inventors: Hamid R. Sayarshad, Newport Beach, CA (US); Shahram Sattar, Toronto (CA)

(73) Assignee: Cornell University, Ithaca, NY (US)

( * ) Notice: Subject to any disclaimer, the term of this patent is extended or adjusted under 35 U.S.C. 154(b) by 58 days.

(21) Appl. No.: 16/673,374

(22) Filed: Nov. 4, 2019

(65) Prior Publication Data

US 2020/0143306 A1    May 7, 2020

Related U.S. Application Data

(60) Provisional application No. 62/754,871, filed on Nov. 2, 2018.

(51) Int. Cl.
*G06Q 10/06* (2012.01)
*G06Q 10/02* (2012.01)
(Continued)

(52) U.S. Cl.
CPC ....... *G06Q 10/06315* (2013.01); *G06Q 10/02* (2013.01); *G06Q 10/047* (2013.01); *G06Q 30/0284* (2013.01); *G06Q 2240/00* (2013.01)

(58) Field of Classification Search
None
See application file for complete search history.

(56) References Cited

U.S. PATENT DOCUMENTS 6,411,895 B1    6/2002  Lau et al.
7,516,010 B1    4/2009  Kaplan et al.
(Continued)

FOREIGN PATENT DOCUMENTS

WO      2017033174 A1    3/2017

OTHER PUBLICATIONS

Boucherie et al., Markov Decision Processes in Practice, International Series in Operations Research and Management Science, Springer, vol. 248 (Year: 2017).*
(Continued)

*Primary Examiner* — Patricia H Munson
*Assistant Examiner* — Chesiree A Walton
(74) *Attorney, Agent, or Firm* — Ryan, Mason & Lewis, LLP

(57) ABSTRACT

A processing device is configured to detect arrival of at least a particular user in a group of a plurality of users competing for designated resources of a system, and responsive to the detected arrival, to solve a resource allocation optimization problem that considers individualized characteristics of user resource allocation requests of respective ones of the users to obtain potential assignments of respective ones of the users to respective ones of the resources. The processing device is further configured to update one or more game model parameters based at least in part on the solution to the resource allocation optimization problem, to update a specified look-ahead function based at least in part on the one or more updated game model parameters, and to assign the particular user to a particular one of the resources based at least in part on a difference between an updated value of the look-ahead function and a previous value of the look-ahead function.

25 Claims, 8 Drawing Sheets

(51) Int. Cl.
 G06Q 30/02 (2012.01)
 G06Q 10/04 (2012.01)

(56) References Cited

U.S. PATENT DOCUMENTS

| | | | |
|---|---|---|---|
| 2002/0029164 A1 | 3/2002 | Sugar et al. | |
| 2002/0099574 A1 | 7/2002 | Cahill et al. | |
| 2004/0068433 A1 | 4/2004 | Chatterjee et al. | |
| 2004/0254840 A1 | 12/2004 | Slemmer et al. | |
| 2005/0033634 A1 | 2/2005 | Pugliese, III | |
| 2005/0280555 A1 | 12/2005 | Warner, IV | |
| 2006/0250278 A1 | 11/2006 | Tillotson et al. | |
| 2007/0040701 A1 | 2/2007 | Browne et al. | |
| 2008/0263147 A1 | 10/2008 | Ponert et al. | |
| 2010/0007525 A1 | 1/2010 | Shanbhag et al. | |
| 2010/0117820 A1 | 5/2010 | Mitschele | |
| 2010/0191584 A1 | 7/2010 | Fraser et al. | |
| 2011/0022427 A1 | 1/2011 | Dayan | |
| 2011/0068739 A1 | 3/2011 | Smith | |
| 2011/0224899 A1 | 9/2011 | Mathews | |
| 2012/0056758 A1 | 3/2012 | Kuhlman et al. | |
| 2012/0095791 A1 | 4/2012 | Stefik et al. | |
| 2012/0095792 A1 | 4/2012 | Stefik et al. | |
| 2013/0073350 A1 | 3/2013 | Blustein | |
| 2013/0143536 A1 | 6/2013 | Ratti | |
| 2013/0265174 A1 | 10/2013 | Scofield et al. | |
| 2013/0268187 A1 | 10/2013 | Scofield et al. | |
| 2014/0149153 A1* | 5/2014 | Cassandras | G08G 1/14 705/5 |
| 2015/0066545 A1 | 3/2015 | Kotecha et al. | |
| 2017/0039779 A1 | 2/2017 | Vander Helm et al. | |
| 2018/0033302 A1 | 2/2018 | Chan | |
| 2018/0268617 A1* | 9/2018 | Bruce | G08G 1/142 |
| 2019/0005739 A1 | 1/2019 | Gazlay et al. | |
| 2019/0026796 A1* | 1/2019 | Dinis da Silva de Carvalho | G06Q 30/04 |
| 2019/0057605 A1 | 2/2019 | Brown et al. | |
| 2019/0147743 A1 | 5/2019 | Kamini et al. | |
| 2019/0197613 A1 | 6/2019 | Levy et al. | |
| 2021/0188268 A1* | 6/2021 | Goto | B60W 30/181 |

OTHER PUBLICATIONS

Du et al., Stoichasstic Poisson Game for an Online Decentralized and Coordinated Parking Mechanism, Transportation Research Part B Methodological, May 2016 (Year: 2016).*

E. Chaniotakis et al., "Drivers' Parking Location Choice Under Uncertain Parking Availability and Search Times: A Stated Preference Experiment," Transportation Research Part A: Policy and Practice, Jul. 23, 2015, 16 pages, vol. 82, No. C.

E. Kokolaki et al., "Leveraging Information in Parking Assistance Systems," IEEE Transactions on Vehicular Technology (TVT), Nov. 2013, 29 pages, vol. 62, No. 9.

D. Ayala et al., "Parking Slot Assignment Games," Proceedings of the 19th ACM SIGSPATIAL International Conference on Advances in Geographic Information Systems (GIS), Nov. 1-4, 2011, pp. 299-308.

S.-Y. Cheung et al., "Traffic Surveillance by Wireless Sensor Networks: Final Report," University of California, California Path Program, Institute of Transportation Studies, California PATH Research Report UCB-ITS-PRR-2007-4, Jan. 29, 2007, 159 pages.

L. Du et al., "Stochastic Poisson Game for an Online Decentralized and Coordinated Parking Mechanism," Transportation Research Part B: Methodological, May 2016, pp. 44-63, vol. 87.

Y. Geng et al., "New "Smart Parking" System Based on Resource Allocation and Reservations," 14th International IEEE Conference on Intelligent Transportation Systems, Oct. 5-7, 2011, pp. 979-984.

L. Guo et al., "Modeling Parking Behavior Under Uncertainty: A Static Game Theoretic Versus a Sequential Neo-Additive Capacity Modeling Approach," Networks and Spatial Economics, 2013, pp. 327-350, vol. 13.

F. He et al., "Pricing of Parking Games with Atomic Players," Transportation Research Part B: Methodological, Mar. 2015, pp. 1-12, vol. 73.

M.Y.I. Idris et al., "Car Park System: A Review of Smart Parking System and its Technology," Information Technology Journal, Feb. 2009, pp. 101-113, vol. 8, No. 2.

E. Kokolaki et al., "On the Efficiency of Information-Assisted Search for Parking Space: A Game-Theoretic Approach," 7th International Workshop on Self-Organizing Systems (IWSOS), May 2013, pp. 54-65.

D. Mackowski et al., "Parking Space Management Via Dynamic Performance-Based Pricing," arXiv: 1501-00638, Jan. 4, 2015, pp. 1-18.

N. Mejri et al., "Cooperation Versus Competition Towards an Efficient Parking Assignment Solution," IEEE International Conference on Communications (ICC), Jun. 10-14, 2014, pp. 2915-2920.

Z. Qian et al., "Optimal Parking Pricing in General Networks with Provision of Occupancy Information," Procedia—Social and Behavioral Sciences, 2013, pp. 779-805, vol. 80.

C.J. Rodier et al., "Transit-Based Smart Parking: An Evaluation of the San Francisco Bay Area Field Test," Transportation Research Part C: Emerging Technologies, Apr. 2010, pp. 225-233, vol. 18, No. 2.

H.R. Sayarshad et al., "A Scalable Non-Myopic Dynamic Dial-a-Ride and Pricing Problem for Competitive On-Demand Mobility Systems," Transportation Research PartC: Emerging Technologies, Jun. 2018, pp. 192-208, vol. 91.

Hamid Reza Sabarshad, "Smart Transit Dynamic Optimization and Informatics," Ryerson University, PhD Dissertation, 2015, 142 pages.

H.R. Sayarshad et al., "A Non-Myopic Dynamic Inventory Routing and Pricing Problem," Transportation Research Part E: Logistics and Transportation Review, Jan. 2018, pp. 83-98, vol. 109.

Sfpark, "SFpark Pricing Policy: Off-Street Parking," http://sfpark.org/wp-content/uploads/2012/04/SFpark-off-street-pricing-policy-3-29-122.pdf, Mar. 29, 2012, pp. 1-21.

S.A. Shaheen et al., "Smart Parking Management Field Test: A Bay Area Rapid Transit (BART) District Parking Demonstration," University of California, California Path Program, Institute of Transportation Studies, California PATH Working Paper UCB-ITS-PWP-2006-10, Aug. 2006, 82 pages.

Donald Shoup, "The High Cost of Free Parking," Journal of Planning Education and Research, Jan. 1997, pp. 1-6.

B. Zou et al., "A Mechanism Design Based Approach to Solving Parking Slot Assignment in the Information Era," Transportation Research Part B, May 21, 2015, pp. 631-653, vol. 81.

Z. Chen et al., "Parking Reservation for Managing Downtown Curbside Parking," Transportation Research Record: Journal of the Transportation Research Board, Jan. 1, 2015, pp. 12-18, vol. 2498, No. 1.

R. Hassin et al., "To Queue or Not to Queue: Equilibrium Behavior in Queueing Systems," Kluwer Academic Publishers, 2006, 199 pages.

V. Mak et al., "The Price of Anarchy in Social Dilemmas: Traditional Research Paradigms and New Network Applications," Organizational Behavior and Human Decision Processes, Mar. 2013, pp. 142-153, vol. 120, No. 2.

R.T. Marler et al., "Function-Transformation Methods for Multi-Objective Optimization," Engineering Optimization, Sep. 2005, pp. 551-570, vol. 37, No. 6.

P. Naor, "The Regulation of Queue Size by Levying Tolls," Econometrica, Jan. 1969, pp. 15-24, vol. 37, No. 1.

NYC Department of City Planning Transportation Division, "Manhattan Core Public Parking Study," UPWP Project No. PTCP08D00.G06, Dec. 2011, 63 pages.

H.R. Sayarshad et al., "Optimizing Dynamic Switching Between Fixed and Flexible Transit Services with an Idle-Vehicle Relocation Strategy and Reductions in Emissions," Abstract, Proceedings of the 98th Annual Meeting of the Transportation Research Board, 2019, 2 pages.

V. R. Rao, "Handbook of Pricing Research in Marketing," Edward Elgar Publishing Limited, 2009, 403 pages.

(56) References Cited

OTHER PUBLICATIONS

N. C. Knudsen, "Individual and Social Optimization in Multiserver Queue with a General Cost-Benefit Structure," Econometrica, May 1972, vol. 40, No. 3, pp. 515-528.
K.R. Krishnan, "Joining the Right Queue: A Markov Decision-Rule," Proceedings of the 26th IEEE Conference on Decision and Control, Dec. 9-11, 1987, pp. 1863-1868.
K.R. Krishnan, "Joining the Right Queue: A State-Dependent Decision Rule," IEEE Transactions on Automatic Control, Jan. 1990, vol. 35, No. 1, pp. 104-108.
D. C. Shoup, "Cruising for Parking," Transport Policy, vol. 13, 2006, pp. 479-486.
H.R. Sayarshad et al., "Non-myopic Dynamic Routing of Electric Taxis with Battery Swapping Stations," Sustainable Cities and Society, vol. 57, Feb. 2020, 32 pages.
W. B. Powell, "Approximate Dynamic Programming: Solving the Curses of Dimensionality," 2nd Edition, John Wiley and Sons, 2011, 658 pages.
G. Wu et al., "Optimal Design and Planning for Compact Automated Parking Systems," European Journal of Operational Research, Sep. 2018, 15 pages.
C. Lei et al., "Dynamic Pricing and Reservation for Intelligent Urban Parking Management," Transportation Research Part C: Emerging Technologies, Jan. 20, 2017, 34 pages.
E. Kokolaki et al., "Leveraging Information in Parking Assistance Systems," IEEE Transactions on Vehicular Technology, 2013, 29 pages.
F. Bock et al., "Smart Parking: Using a Crowd of Taxis to Sense On-Street Parking Space Availability," IEEE Transactions on Intelligent Transportation Systems, vol. 21, No. 2, Feb. 2020, pp. 496-508.
R. J. Boucherie et al., "Markov Decision Processes in Practice," International Series in Operations Research & Management Science; vol. 248, Springer, 563 pages.
F. Caicedo, "Real-time Parking Information Management to Reduce Search Time, Vehicle Displacement and Emissions," Transportation Research Part D, vol. 15, No. 4, 2010 pp. 228-234.
Y. Du et al., "Allocation of Street Parking Facilities in a Capacitated Network with Equilibrium Constraints on Drivers' Traveling and Cruising for Parking," Transportation Research Part C, vol. 101, 2019, pp. 181-207.
T. Fiez et al., "Gaussian Mixture Models for Parking Demand Data," IEEE Transactions on Intelligent Transportation Systems, vol. 21, No. 8, Aug. 2020, pp. 3571-3580.
N. Firdausiyah et al., "Modeling City Logistics Using Adaptive Dynamic Programming Based Multi-Agent Simulation," Transportation Research Part E: Logistics and Transportation Review, vol. 125, 2019, pp. 74-96.
C. Fisk, "Some Developments in Equilibrium Traffic Assignment," Transportation Research Part B Methodological, vol. 14, No. 3, 1980, 243-255.
E. Hyytiä et al., "Non-Myopic Vehicle and Route Selection in Dynamic DARP with Travel Time and Workload Objectives," Computers & Operations Research, vol. 39, 2012, pp. 3021-3030.
R. Mangiaracina et al., "Smart Parking Management in a Smart City: Costs and Benefits," 2017 IEEE International Conference on Service Operations and Logistics, and Informatics, Sep. 18-20, 2017, 6 pages.
Z. S. Qian et al., "Optimal Occupancy-Driven Parking Pricing Under Demand Uncertainties and Traveler Heterogeneity: A Stochastic Control Approach," Transportation Research Part B: Methodological, vol. 67, 2014, pp. 144-165.
D. Teodorovic et al., Intelligent Parking Systems. European Journal of Operational Research, vol. 175, No. 3, 2006, pp. 1666-1681.
J. Wang et al., "Optimal Parking Supply in Bi-Modal Transportation Network Considering Transit Scale Economies," Transportation Research Part E: Logistics and Transportation Review, vol. 130, 2019, pp. 207-229.
H. Sayarshad et al., "Optimizing the Dynamic Switching in Fixed and Flexible Transit Services with an Idle-Vehicle Relocation Strategy and Reductions in Emissions," Transportation Research Part A: Policy and Practice, vol. 135, 2020, pp. 198-214.

* cited by examiner

RESOURCE ALLOCATION USING SCALABLE NON-MYOPIC ATOMIC GAME FOR SMART PARKING AND OTHER APPLICATIONS

PRIORITY CLAIM

The present application claims priority to U.S. Provisional Patent Application Ser. No. 62/754,871, filed Nov. 2, 2018 and entitled "A Scalable Non-Myopic Atomic Game for Smart Parking Mechanism," which is incorporated by reference herein in its entirety.

FIELD

The field relates generally to information processing, and more particularly to techniques for resource allocation.

BACKGROUND

The number of vehicles on the road is continually increasing. As a result, it is becoming unduly difficult for drivers to locate available parking spaces in many metropolitan areas, particularly in crowded zones. Drivers often spend significant amounts of time searching for a parking space during a typical trip. This not only increases trip time and contributes to traffic congestion in crowded areas, but also wastes fuel, causes accidents, and pollutes the air. Accordingly, a need exists for improved techniques for allocating resources, such as available parking spaces in multiple parking facilities in a large city.

SUMMARY

Illustrative embodiments implement functionality for resource allocation in smart parking and other applications. For example, some embodiments perform resource allocation using what is referred to herein as a "scalable non-myopic atomic game." Such an embodiment illustratively comprises a smart parking mechanism implemented in a smart parking system that is configured to guide drivers to available parking spaces. Other embodiments can be configured to perform other types of resource allocation.

In one embodiment, an apparatus comprises at least one processing device, with each such processing device comprising a processor coupled to a memory. The processing device is configured to detect arrival of at least a particular user in a group of a plurality of users competing for designated resources of a system, and responsive to the detected arrival, to solve a resource allocation optimization problem that considers individualized characteristics of user resource allocation requests of respective ones of the users to obtain potential assignments of respective ones of the users to respective ones of the resources. The processing device is further configured to update one or more game model parameters based at least in part on the solution to the resource allocation optimization problem, to update a specified look-ahead function based at least in part on the one or more updated game model parameters, and to assign the particular user to a particular one of the resources based at least in part on a difference between an updated value of the look-ahead function and a previous value of the look-ahead function.

In some embodiments, the look-ahead function comprises a social welfare function that is computed at least in part using: (i) a demand function, (ii) a reward function comprising a product of a designated reward and the demand function, (iii) dynamic pricing of the resources, (iv) a performance measure for the system, and (v) a social welfare measure. Other types of look-ahead functions can be used in other embodiments.

The above-noted operations of detecting arrival of at least a particular user, solving a resource allocation optimization problem, updating one or more game model parameters, updating a specified look-ahead function, and assigning the particular user to a particular one of the resources are illustratively repeated for each of one or more additional users in conjunction with the additional user joining the group of users.

In some embodiments, the particular user comprises a user in a group of N users, n=1, 2, . . . N, the users being associated with respective ones of N vehicles, and the designated resources comprise respective ones of M parking facilities, m=1, 2, . . . M, having respective capacities of available parking spaces $c_m$. The particular user illustratively comprises a most recently arrived user in the group of N users.

Assigning the particular user to a particular one of the resources based at least in part on a difference between an updated value of the look-ahead function and a previous value of the look-ahead function in some embodiments comprises assigning the particular user to a particular one of the M parking facilities having at least one available parking space in a manner that maximizes an increase in the updated value of the look-ahead function relative to the previous value of the look-ahead function.

The individualized characteristics considered by the resource allocation optimization problem can comprise, for example, a travel time $t_{nm}$ for user n to travel from an origin point to parking facility m and a walking time $w_{nm}$ for user n to walk from parking facility m to a destination point.

In an embodiment of this type, the resource allocation optimization problem may more particularly comprise a linear optimization problem that utilizes the travel times $t_{nm}$ and walking times $w_{nm}$ to assign each of the N users to one of the M parking facilities subject to respective capacities of available parking spaces $c_m$.

In some embodiments, the above-noted demand function utilized as part of the look-ahead function is determined based at least in part on an aggregate arrival rate for the system comprising the resources and a probability that a user will join the group of users and eventually receive the designated reward.

The dynamic pricing of the resources may be determined for user n and parking facility m by calculating a queue-joining threshold for parking facility m that maximizes a difference between (i) the reward function as a function of resource price and (ii) a rate at which delay is incurred for user n as a function of resource price.

The performance measure for the system in some embodiments comprises a system cost determined as a function of occupancies of respective ones of the M parking facilities.

The social welfare function may be based at least in part on, for example, cruising times for which respective ones of the N users are driving their respective vehicles in searching for an available parking space.

Some illustrative embodiments implement a non-myopic atomic game smart parking mechanism, which attempts to decrease the cruising time for parking with the assumption of elastic demand for both on-street parking lots and parking garages. For example, a non-myopic atomic game in an illustrative embodiment is formulated to address parking competition issues through assignment of travelers to candidate parking facilities that takes into account the differences in travel times for the vehicles from their respective origins to available parking spaces and then walking times from the parking spaces to final destinations, as well as dynamic pricing, cruising times, and occupancies of the parking facilities.

Such an embodiment illustratively integrates a socially efficient price that accounts for the waiting times of customers in their search for parking. A game model is incorporated into the social optimum problem by considering the competition of travelers with traffic congestion for parking spaces where the individuals' preferences, interests or welfare are reflected into a collective decision such as social welfare.

In one implementation of an embodiment of this type, using actual parking data for the city of San Francisco, it was found that the average social welfare per vehicle was substantially increased using the non-myopic atomic game smart parking mechanism, relative to other parking strategies.

These and other embodiments of the invention include but are not limited to systems, methods, apparatus, processing devices, integrated circuits, and processor-readable storage media having software program code embodied therein.

DETAILED DESCRIPTION

Embodiments of the invention can be implemented, for example, in the form of information processing systems comprising one or more processing platforms each having at least one computer, server or other processing device. Illustrative embodiments of such systems will be described in detail herein. It should be understood, however, that embodiments of the invention are more generally applicable to a wide variety of other types of information processing systems and associated computers, servers or other processing devices or other components. Accordingly, the term "information processing system" as used herein is intended to be broadly construed so as to encompass these and other arrangements.

Figure 1:
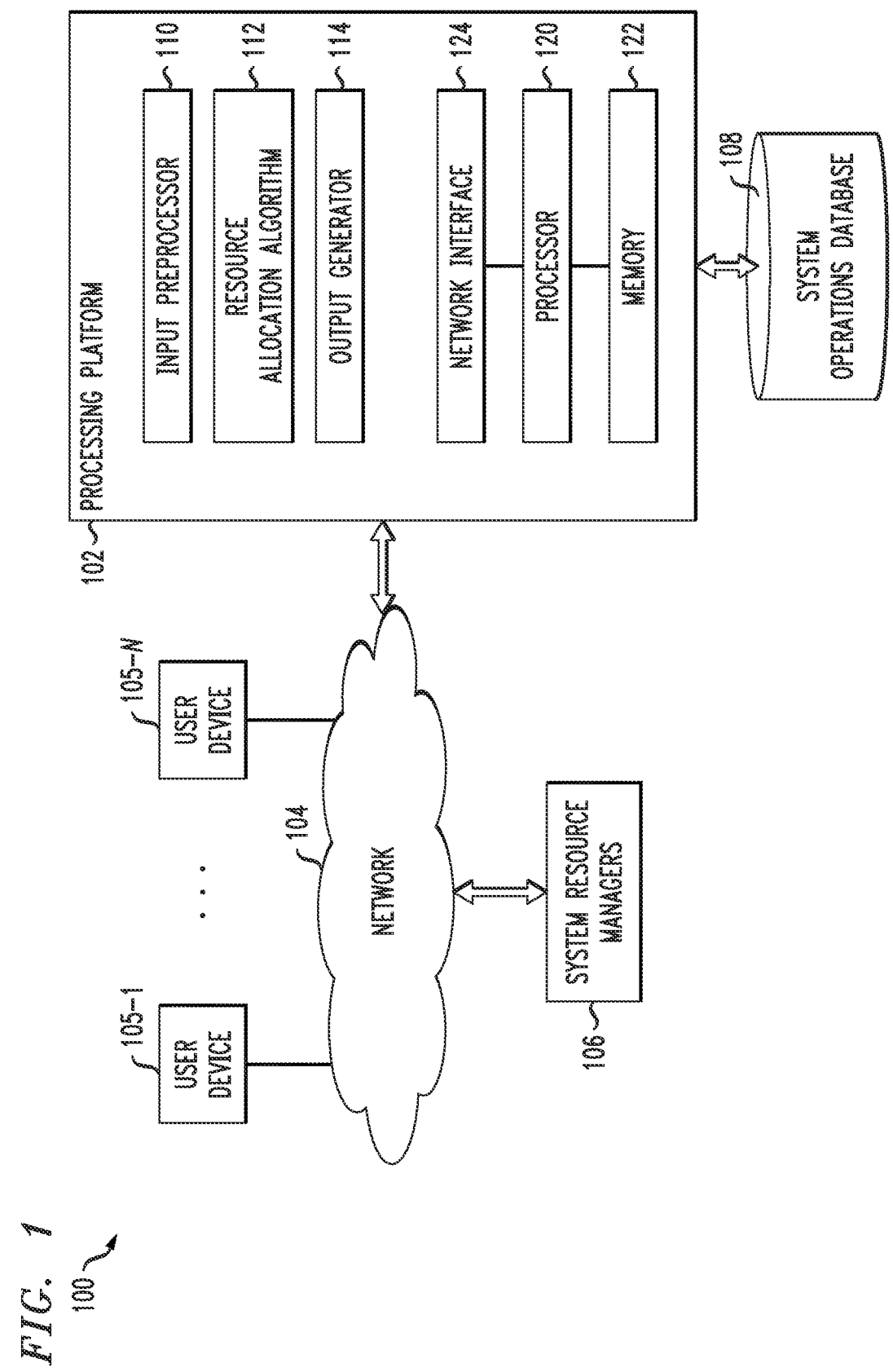
FIG. 1 is a block diagram of an information processing system that incorporates functionality for smart parking and/or one or more other resource allocation applications in an illustrative embodiment.

FIG. 1 shows an information processing system 100 implementing functionality for resource allocation in an illustrative embodiment. The system 100 comprises a processing platform 102 coupled to a network 104. Also coupled to the network 104 are user devices 105-1, . . . 105-N and system resource managers 106. The processing platform 102 is configured to utilize a system operations database 108. Such a database illustratively stores operational information relating to user devices 105, system resource managers 106, and possibly additional or alternative system entities.

The processing platform 102 implements at least one input preprocessor 110, at least one resource allocation algorithm 112 and at least one output generator 114.

The input preprocessor 110 receives user allocation requests from respective ones of the user devices 105, as well as resource availability information from respective ones of the system resource managers 106. For example, in a smart parking application, the user allocation requests illustratively comprise requests for available parking spaces, and the resource availability information comprises indications of available parking spots in parking facilities managed by respective ones of the system resource managers 106. A wide variety of other types of inputs can be received by the processing platform 102 and processed by the input preprocessor 110, such as, for example, geographic information relating to the user devices 105 and resources managed by the system resource managers 106.

Figure 2:
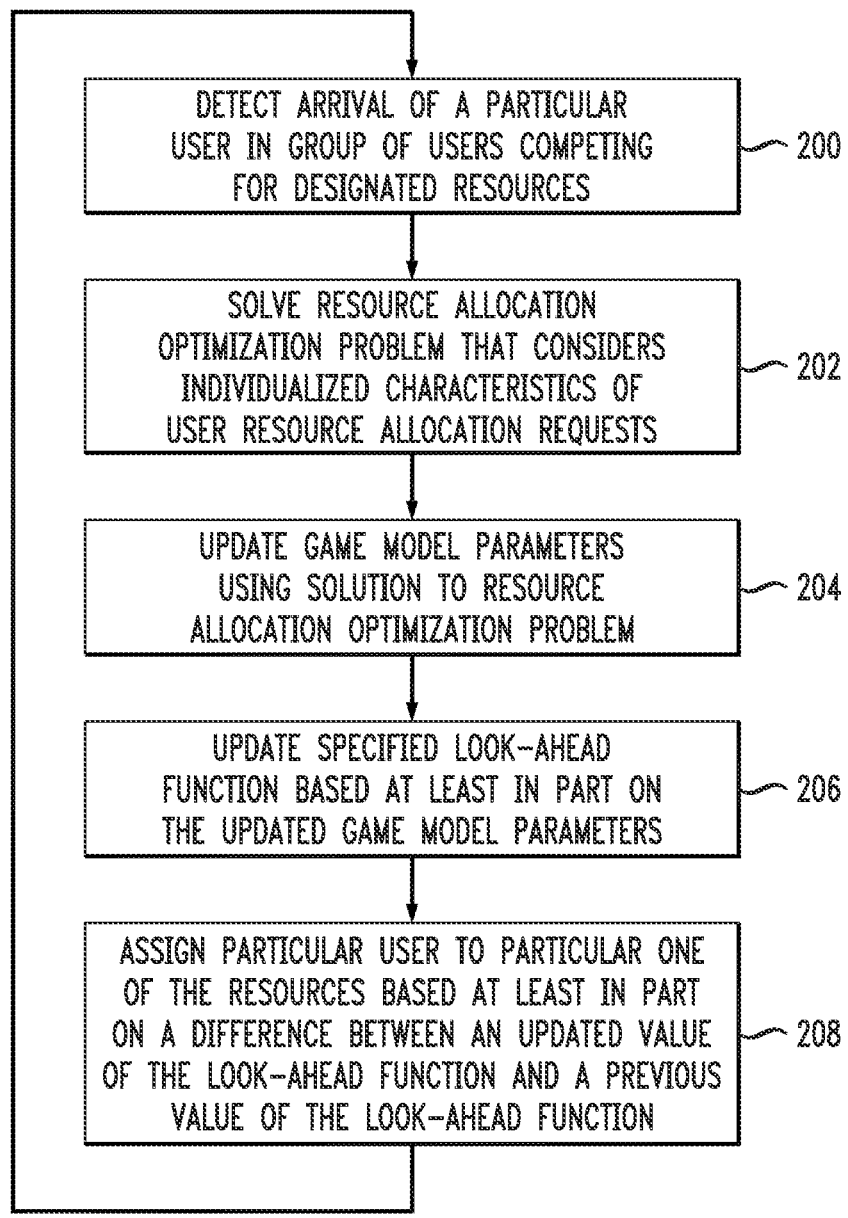
FIG. 2 is a flow diagram of a resource allocation process in an illustrative embodiment.

The resource allocation algorithm 112 utilizes the preprocessed inputs from the input preprocessor 110 to determine an allocation of available resources managed by the system resource managers 106 to particular ones of the user devices 105. Such user devices are examples of what a more generally referred to herein as "users" for which resources are allocated using the resource allocation algorithm 112. Accordingly, a "user" as the term is broadly used herein can comprise a human being or an associated processing device, such as a computer, a mobile telephone, a smart vehicle or an autonomous vehicle (AV). The flow diagram of FIG. 2 illustrates one possible implementation of resource allocation algorithm 112 for use in smart parking and other applications. Additional detailed examples of resource allocation algorithm 112 for use in smart parking and other applications are described elsewhere herein.

The output generator 114 generates one or more control signals for setting, adjusting or otherwise controlling various operating parameters associated with the system 100, such as control signals for delivery to system resource managers 106 to reserve particular resources for particular ones of the user devices 105. For example, such control signals generated by the output generator 114 can comprise signals that carry out or otherwise implement allocation decisions of the resource allocation algorithm 112. These and other signals illustratively cause reservations for particular allocated resources to be reserved in the name of particular users associated with respective ones of the user devices 105 in a reservation center or other similar system entity associated with one or more of the system resource managers 106. A wide variety of different mechanisms may be initiated or otherwise triggered by the output generator 114 based at least in part on decisions generated by the resource allocation algorithm 112. Terms such as "control" and "control signal" as used herein are therefore also intended to be broadly construed.

Although the input preprocessor 110, the resource allocation algorithm 112 and the output generator 114 are all shown as being implemented on processing platform 102 in the present embodiment, this is by way of illustrative example only. In other embodiments, the input preprocessor 110, the resource allocation algorithm 112 and the output generator 114 can each be implemented on a separate processing platform. A given such processing platform is assumed to include at least one processing device comprising a processor coupled to a memory. Examples of such processing devices include computers, servers or other processing devices arranged to communicate over a network. Storage devices such as storage arrays or cloud-based storage systems used for implementation of system operations database 108 are also considered "processing devices" as that term is broadly used herein.

It is also possible that at least portions of other system elements such as the system resource managers 106 can be implemented as part of the processing platform 102, although shown as being separate from the processing platform 102 in the figure.

The processing platform 102 is configured for bidirectional communication with the user devices 105 and the system resource managers 106 over the network 104. For example, control signals or other types of outputs generated by the output generator 114 of processing platform 102 can be transmitted over the network 104 to user devices 105 such as, for example, a laptop computer, tablet computer or desktop personal computer, a mobile telephone, or another type of computer or communication device, as well as combinations of multiple such devices. As indicated previously, user devices 105 can additionally or alternatively include smart vehicles driven by humans as well as AVs that do not necessarily have human drivers. Control signals provided by the output generator 114 can be used, for example, to guide users associated with the user devices 105 to respective available parking spaces or other types of resources allocated to those users in accordance with decisions generated by the resource allocation algorithm 112. The processing platform 102 can also receive over the network 104 various types of input data from the user devices 105, system resource managers 106 or other data sources, including one or more external data sources not explicitly shown in this figure, such as one or more Geographic Information Systems (GISs).

The network 104 can comprise, for example, a global computer network such as the Internet, a wide area network (WAN), a local area network (LAN), a satellite network, a telephone or cable network, a cellular network such as a 3G, 4G or 5G network, a wireless network implemented using a wireless protocol such as Bluetooth, WiFi or WiMAX, or various portions or combinations of these and other types of communication networks.

Various types of automated actions can be performed by the processing platform 102 based at least in part on resource allocation decisions of the resource allocation algorithm 112. Examples of automated actions that may be taken in the processing platform 102 responsive to outputs generated by the resource allocation algorithm 112 include generating in the output generator 114 at least one control signal for controlling at least one of the user devices 105 or system resource managers 106 over the network 104, generating at least a portion of at least one output display for presentation on a terminal of at least one of the user devices 105 or system resource managers 106, generating an alert for delivery to at least one of the user devices 105 or system resource managers 106 over the network 104, and storing the outputs generated by output generator 114 in the system operations database 108. Additional or alternative automated actions may be taken in other embodiments.

The processing platform 102 in the present embodiment further comprises a processor 120, a memory 122 and a network interface 124. The processor 120 is assumed to be operatively coupled to the memory 122 and to the network interface 124 as illustrated by the interconnections shown in the figure.

The processor 120 may comprise, for example, a microprocessor, an application-specific integrated circuit (ASIC), a field-programmable gate array (FPGA), a central processing unit (CPU), an arithmetic logic unit (ALU), a digital signal processor (DSP), or other similar processing device component, as well as other types and arrangements of processing circuitry, in any combination.

As a more particular example, in some embodiments, the processor 120 comprises one or more graphics processor integrated circuits. Such graphics processor integrated circuits are illustratively implemented in the form of one or more graphics processing units (GPUs). Accordingly, in some embodiments, system 100 is configured to include a GPU-based processing platform.

The memory 122 stores software program code for execution by the processor 120 in implementing portions of the functionality of the processing platform 102. For example, at least portions of the functionality of input preprocessor 110, resource allocation algorithm 112 and output generator 114 can be implemented using program code stored in memory 122.

A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, flash memory, read-only memory (ROM), magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with one or more of the input preprocessor 110, the resource allocation algorithm 112 and the output generator 114 as well as other related functionality.

The network interface 124 is configured to allow the processing platform 102 to communicate over one or more networks with other system elements, and may comprise one or more conventional transceivers.

In operation, the processing platform 102 is configured to detect arrival of at least a particular user in a group of a plurality of users competing for designated resources of the system 100, and responsive to the detected arrival, to solve a resource allocation optimization problem that considers individualized characteristics of user resource allocation requests of respective ones of the users to obtain potential assignments of respective ones of the users to respective ones of the resources. The processing platform 102 is further configured to update one or more game model parameters based at least in part on the solution to the resource allocation optimization problem, to update a specified look-ahead function based at least in part on the one or more updated game model parameters, and to assign the particular user to a particular one of the resources based at least in part on a difference between an updated value of the look-ahead function and a previous value of the look-ahead function.

The group of users referred to above illustratively comprises a plurality of human users associated with respective ones of the user devices 105, and therefore may comprise a group of N users. As noted previously, the "users" as that term is broadly used herein can additionally or alternatively refer to the user devices 105, rather than respective human users. Such users in some embodiments are also referred to herein as "travelers," "vehicles" or "customers." However, the term "user" herein is intended to be more broadly construed, so as to encompass, for example, numerous arrangements of human, hardware, software or firmware entities, as well as combinations of such entities. The particular user whose arrival in the group illustratively triggers a process for solving a resource allocation optimization problem can comprise, for example, a most recently arrived user in the group of N users.

In some embodiments, the look-ahead function referred to above illustratively comprises a social welfare function that is computed at least in part using one or more of the following elements: (i) a demand function, (ii) a reward function comprising a product of a designated reward and the demand function, (iii) dynamic pricing of the resources, (iv) a performance measure for the system, and (v) a social welfare measure. Additional details regarding such look-ahead functions are provided elsewhere herein. Other types of look-ahead functions can be used in other embodiments.

The above-noted operations of the processing platform 102 in detecting arrival of at least a particular user, solving a resource allocation optimization problem, updating one or more game model parameters, updating a specified look-ahead function, and assigning the particular user to a particular one of the resources are illustratively repeated by the processing platform 102 for each of one or more additional users, possibly in conjunction with the additional user joining the group of users.

In an example smart parking application disclosed herein, the above-noted particular user illustratively comprises a most recently arrived user in the group of N users, n=1, 2, . . . N, with the users being associated with respective ones of N vehicles, and the designated resources comprise respective ones of M parking facilities, m=1, 2, . . . M, having respective capacities of available parking spaces $c_m$.

The term "parking facility" as used herein is intended to be broadly construed, and may comprise, for example, a parking lot, a parking garage, or other arrangement of one or more parking spaces. A parking facility as that term is broadly defined herein can therefore comprise, for example, off-street parking, on-street parking or combinations thereof.

Assigning the particular user to a particular one of the resources based at least in part on a difference between an updated value of the look-ahead function and a previous value of the look-ahead function in such an embodiment comprises the resource allocation algorithm 112 assigning the particular user to a particular one of the M parking facilities having at least one available parking space in a manner that maximizes an increase in the updated value of the look-ahead function relative to the previous value of the look-ahead function.

The individualized characteristics considered by the resource allocation optimization problem can comprise, for example, a travel time $t_{nm}$ for user n to travel from an origin point to parking facility m and a walking time $w_{nm}$ for user n to walk from parking facility m to a destination point.

In an embodiment of this type, the resource allocation optimization problem solved by the resource allocation algorithm 112 as part of a resource allocation process more particularly comprises a linear optimization problem that utilizes the travel times $t_{nm}$ and walking times $w_{nm}$ to assign each of the N users to one of the M parking facilities subject to respective capacities of available parking spaces $c_m$.

In some embodiments, the above-noted demand function utilized as part of the look-ahead function is determined based at least in part on an aggregate arrival rate for the system comprising the resources and a probability that a user will join the group of users and eventually receive the designated reward.

The dynamic pricing of the resources may be determined for user n and parking facility m by calculating a queue-joining threshold for parking facility m that maximizes a difference between (i) the reward function as a function of resource price and (ii) a rate at which delay is incurred for user n as a function of resource price.

The performance measure for the system in some embodiments comprises a system cost determined as a function of occupancies of respective ones of the M parking facilities.

The social welfare function may be based at least in part on, for example, cruising times for which respective ones of the N users are driving their respective vehicles in searching for an available parking space.

Additional aspects of these and other illustrative embodiments will be described in more detail elsewhere herein.

It is to be appreciated that the particular arrangements of components and other system elements shown in FIG. 1 is presented by way of illustrative example only, and numerous alternative embodiments are possible. For example, other embodiments of information processing systems each comprising one or more processing devices can be configured to provide resource allocation functionality of the type disclosed herein.

FIG. 2 shows an example of a set of processing operations performed by the resource allocation algorithm 112 in an illustrative embodiment. The algorithm in this embodiment comprises a process having steps 200 through 208 which are illustratively executed by the processing platform 102, utilizing processor 120, memory 122 and network interface 124, and possibly similar components of one or more additional processing devices of the processing platform 102.

In step 200, the arrival of a particular user in group of users competing for designated resources is detected. Any of a variety of different techniques can be used to determine that a particular user or users have joined a group of multiple users for which resources are currently being allocated. For example, the detection can comprise receipt of a resource allocation request from a new user.

In step 202, a resource allocation optimization problem that considers individualized characteristics of user resource allocation requests is solved. For example, the resource allocation optimization problem is illustratively triggered responsive to the above-described detection of a new user entering a group of users for which resources are currently being allocated. It need not immediately follow the detection of one or more new users. The resource allocation optimization problem incorporating one or more new users can instead be initiated at some point after the arrival of the one or more new users, but nonetheless is considered "responsive to" the detection of that arrival, as that term is broadly used herein.

In step 204, game model parameters are updated using the solution to resource allocation optimization problem.

In step 206, a specified look-ahead function is updated based at least in part on the updated game model parameters.

In step 208, the particular user is assigned to a particular one of the resources based at least in part on a difference between an updated value of the look-ahead function and a previous value of the look-ahead function. The process then returns to step 200 as shown in order to process the next arriving user.

As noted above, in an example smart parking application, the particular user may be a most recently arrived user in the group of N users, n=1, 2, . . . N, with the users being associated with respective ones of N vehicles, and the designated resources comprise respective ones of M parking facilities, m=1, 2, . . . M, having respective capacities of available parking spaces $c_m$. The particular user in this example is assigned in step 208 to a particular one of the M parking facilities having at least one available parking space.

This assignment of the particular user to a particular parking facility having an available parking space is illustratively performed by the resource allocation algorithm 112 in a manner that maximizes an increase in the updated value of the look-ahead function relative to the previous value of the look-ahead function.

The particular processing operations and other system functionality described in conjunction with the flow diagram of FIG. 2 and other diagrams herein are presented by way of illustrative example only, and should not be construed as limiting the scope of the disclosure in any way. Alternative embodiments can use other types of processing operations for implementing resource allocation functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different resource allocation processes for respective different sets of users and resources.

Functionality such as that described in conjunction with the flow diagram of FIG. 2 and other flow diagrams herein can be implemented at least in part in the form of one or more software programs stored in memory 122 and executed by processor 120 within the processing platform 102. A memory or other storage device having executable program code of one or more software programs embodied therein is an example of what is more generally referred to herein as a "processor-readable storage medium." Articles of manufacture or other computer program products each comprising one or more such processor-readable storage media are considered illustrative embodiments of the present disclosure.

Numerous additional examples of resource allocation algorithms are described in detail elsewhere herein.

As mentioned previously, the illustrative embodiments of FIGS. 1 and 2 are suitable for use in a wide variety of different resource allocation applications. Smart parking is one such application, and illustrative embodiments of smart parking systems will be described in more detail below with reference to FIGS. 3 and 4. These figures show information processing systems that more particularly include smart parking functionality using resource allocation algorithms that implement scalable non-myopic atomic games. Such systems are also referred to herein as "smart parking systems." A given such smart parking system is illustratively configured to utilize decisions made by a resource allocation algorithm of the type described above to guide vehicles or other users to respective available parking spaces.

Some smart parking systems as disclosed herein can be configured to incorporate computer-aided systems for placing human-driven vehicles or AVs in available parking spaces. Real-time information can be used in such embodiments to improve vehicle detection, parking space monitoring and parking space assignment. For example, some embodiments can be implemented in the form of a parking guidance and information (PGI) system that supports travelers looking for parking spaces by using sensors that are placed in the area. Coordinated smart parking system software in such embodiments can control areas and find vacant parking spaces for travelers in order to reduce parking facility queue length, reduce cruising time, and provide other advantages to travelers, parking facilities and the environment. Numerous additional or alternative types of smart parking features and functionality can be implemented in other embodiments.

Figure 3:
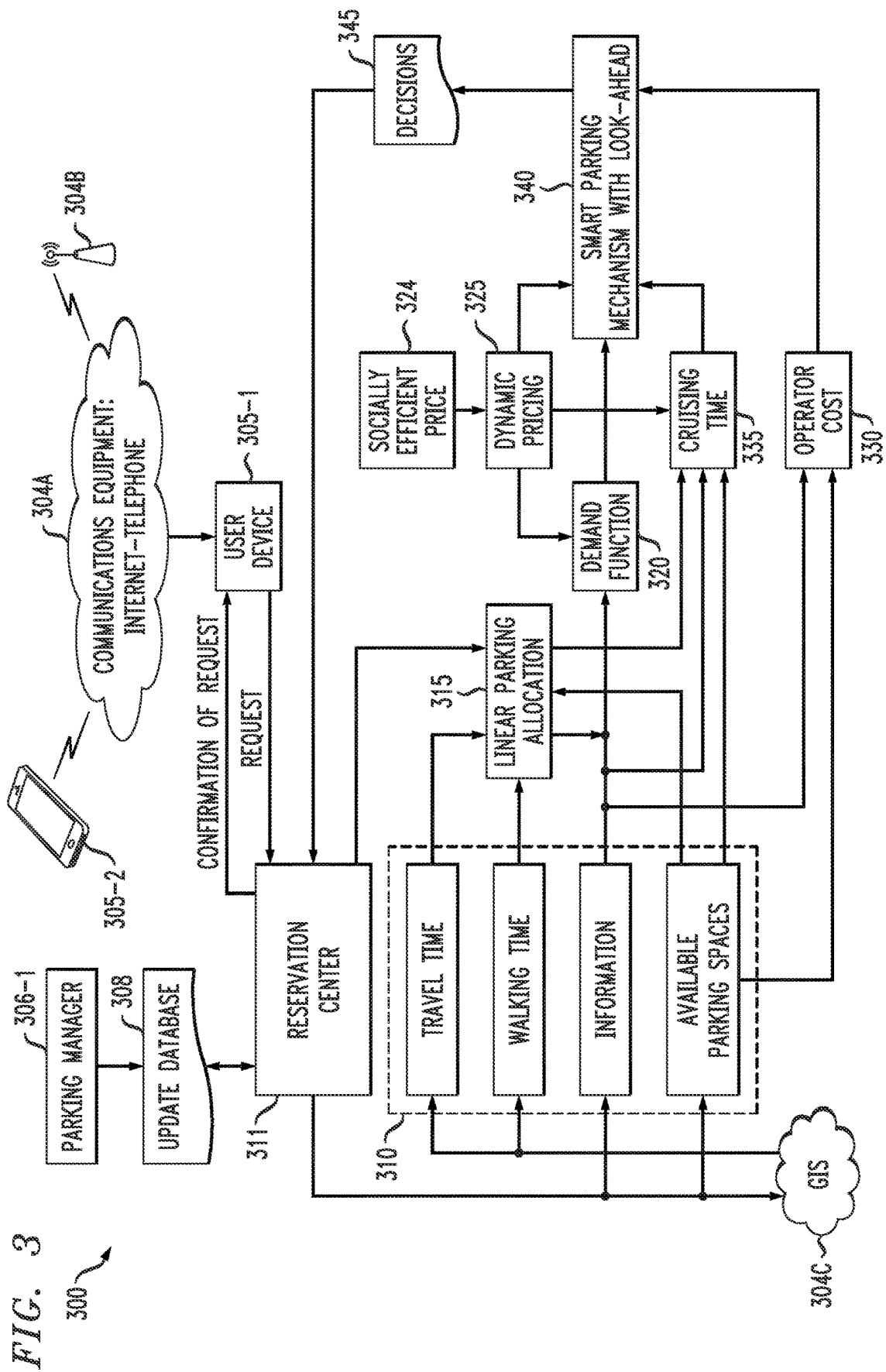
FIGS. 3 and 4 show examples of smart parking systems using scalable non-myopic atomic games in illustrative embodiments.

Referring now to FIG. 3, a smart parking system 300 in an illustrative embodiment comprises a network 304 that includes respective portions 304A, 304B and 304C of a plurality of different networks. Network portion 304A comprises communications equipment such as Internet and/or telephone equipment that is illustratively in communication with user devices 305-1 and 305-2 and another network portion 304B that comprises, for example, a base station or other wireless access point. A third portion 304C illustratively comprises a GIS that provides geographic information utilized by smart parking system 300. Other types and arrangements of multiple network portions can be used.

The system 300 further comprises at least one parking manager 306-1 that provides information used to update a database 308. The parking manager 306-1 may be viewed as an example of one of the system resource managers 106 of the system 100 of FIG. 1, and additional parking managers may be present in the system 300 but are not explicitly shown. Similarly, the database 308 may be viewed as an example of the system operations database 108 of system 100. The system 300 illustratively processes a plurality of inputs 310 which in this embodiment include travel time, walking time, available parking spaces, and other information utilized in execution of a resource allocation algorithm.

Also implemented in system 300 is a reservation center 311, which is illustratively in communication with one or more of the user devices 305 and the database 308 as shown. The reservation center 311 may be part of a processing platform that implements a resource allocation algorithm of the system 300, or may be deployed in whole or in part outside of such a processing platform, as a separate system entity. For example, in some embodiments, reservation center 311 may perform functionality similar to that previously described as being performed by one or both of input preprocessor 110 and output generator 114 of processing platform 102 in the FIG. 1 embodiment.

The resource allocation algorithm implemented in system 300 comprises a plurality of components that interact with one another in the manner illustrated in the figure. These include linear parking allocation 315, which is triggered by an output of the reservation center 311 and utilizes travel time and walking time from inputs 310 to solve a linear optimization problem, demand function 320, dynamic pricing 325 which is based on a socially efficient price 324, operator cost 330, cruising time 335, and smart parking mechanism with look-ahead 340. The smart parking mechanism with look-ahead 340 generates resource allocation decisions 345 that are returned to the reservation center 311 as shown.

Figure 4:
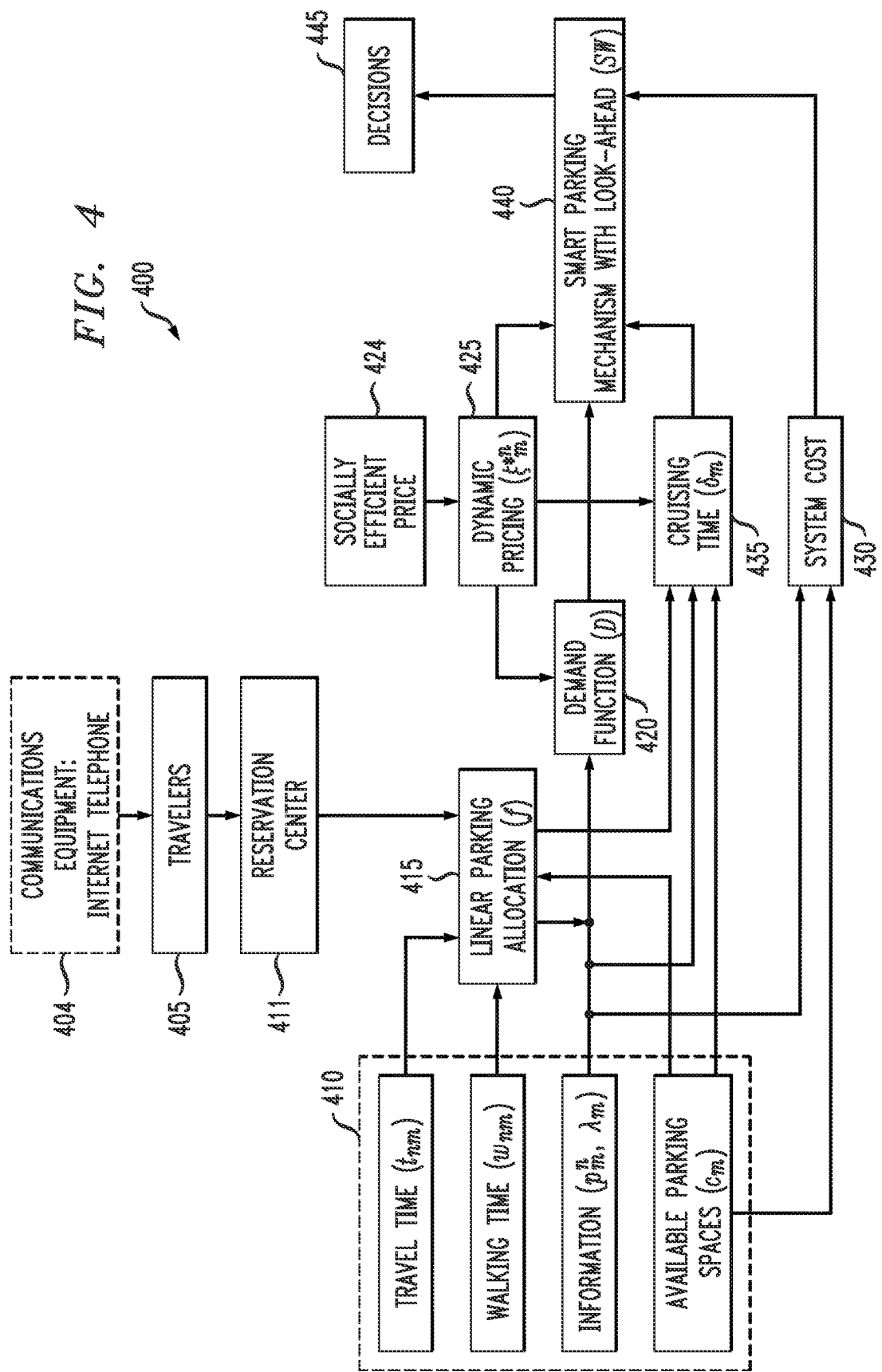

FIG. 4 shows another example of a smart parking system 400 that is similar in many respects to smart parking system 300 of FIG. 3, but further labels certain system components with notation that will be used in additional description below of an illustrative resource allocation algorithm implementing a scalable non-myopic atomic game for smart parking. The components 404, 405, 410, 411, 415, 420, 424, 425, 430, 435, 440 and 445 of system 400 correspond generally to respective components 304, 305, 310, 311, 315, 320, 324, 325, 330, 335, 340 and 345 of system 300 of FIG. 3.

Additional details of illustrative embodiments will now be described. These include example implementations of smart parking algorithms. It is to be appreciated, however, that such embodiments can be adapted in a straightforward manner for use in a wide variety of other types of resource allocation applications.

In the embodiments to be described, factors such as dynamic pricing, cruising time and system cost are taken into account in the resource allocation algorithm. The resulting parking strategies consider optimality for each independent traveler, illustratively updated using online information both to increase parking facility revenue and to reduce cruising time among the vehicles that are searching for parking spaces. The smart parking system in these embodiments implements a scalable and sustainable smart parking mechanism that provides benefits for travelers and parking facilities while decreasing the vehicle miles traveled, which has important implications for fuel consumption and the environment. As a result, illustrative embodiments herein can alleviate imbalances between supply and demand for parking spaces, particularly in crowded metropolitan areas in which high average monthly and daily parking fees contribute to such imbalances. Some implementations of the illustrative embodiments are configured to consider the elasticity of parking demand and service rate under a dynamic pricing policy on a large scale.

These embodiments illustratively implement a dynamic parking assignment process that allows independent travelers to have a competition by including their travel times from their respective origins to parking facilities in the resource allocation algorithm. Individual travelers are respective players in the game, and can be satisfied by finding their optimal price, minimum walking distance, and minimum cruising time under a look-ahead that controls user-optimality. Moreover, these embodiments address collective decision processes by aggregating individual preferences into a social welfare function that controls system-optimality. The resulting smart parking system is able to operate more effectively by finding an optimized trade-off between both system and user performances.

A given such embodiment can be viewed as implementing a sustainable parking game that facilitates competition between travelers to find a parking space under a demand-supply equilibrium with a social optimization criterion.

For example, some embodiments implement a socially optimal pricing policy, instead of a fixed price or a pricing that does not take customer waiting time into account. The optimal pricing policy may be dependent on factors such as a queue-joining threshold that reflects the number of travelers joining the queue, customer arrival rate, and service rate, as will be described in more detail below.

The resource allocation algorithm in some embodiments implements a one-to-one assignment between travelers and parking facilities, and is therefore illustratively referred to herein as implementing an "atomic" parking game. The look-ahead functionality implemented in the resource allocation algorithm in illustrative embodiments is reflected in the references herein to a "non-myopic" parking game. The term "game" as used herein is also intended to be broadly construed, so as to encompass, for example, various arrangements in which a smart parking mechanism accounts for competition of multiple individual users in its allocation of resources across those users.

In some embodiments, a smart parking system implements an efficient scalable dynamic parking mechanism, illustratively based at least in part on a Markov decision process (MDP), to assign available parking spaces to travelers. Such embodiments combine information on future cruising and elasticity of demand into a dynamic pricing policy which can have a sizable effect on traffic congestion, energy and emissions.

For example, a given illustrative embodiment provides a game of competition among travelers for parking facilities under non-myopic policy, integrates a socially efficient price that accounts for customer waiting time in the search for parking, and implements a pricing strategy that assigns priority to travelers depending on their willingness to pay in order to achieve a social optimum.

As will be described, some embodiments optimally solve sequences of smaller parking optimization problems, possibly using an approximation dynamic programming (ADP), rather than solving a single large parking optimization problem. Such an embodiment combines optimization formulation and simulation in an MDP framework that uses iterative learning and yields a policy that resembles simulation. Integrating the smart parking mechanism with usage of AVs can offer sustainable benefits in service levels, parking facility usage, energy savings and reduced emissions.

An example problem definition will now be described. In this embodiment, we utilize a non-myopic parking game model where individual vehicles in a crowded urban area are seeking parking spaces and have multiple parking facilities that they could use. It is assumed that the smart parking system in this embodiment is configured in accordance with the example arrangement shown in FIG. 4. Using the communications equipment 404, travelers 405, also referred to herein as "customers" or more generally "users," send parking requests to the reservation center 411. Based on current arrival times, origin-destination pairs, and parking capacities, the smart parking system 400 generates a temporary parking preference for each traveler in order to calculate the utility function of an individual traveler. The smart parking system 400 takes into account the variability in network travel time for each individual traveler in order to better reflect the reality of the game model in terms of competition among vehicles based on traffic congestion and available parking spaces.

The probability of traveler choice of each parking facility is calculated using a multinomial logit (MNL) choice model. By updating the parameters, the methodology provides the optimal socially efficient price by the tradeoff between reward and the waiting cost. The optimal price is used to refine the temporary parking preference, where the system assigns a parking space by considering the traveler cost that combines proximity to destination and cruising time with a dynamic pricing strategy. In addition, a social welfare function is established by involving the reward, the system cost, and the cruising time for parking, which finally determine the optimal parking assignment. Thus, the non-myopic smart parking mechanism can reduce the cruising times of travelers who have different travel costs while also achieving a socially efficient pricing strategy.

We apply an ADP approach based on a Bellman equation in which network effects (network component i) and timing effects are represented by an expression derived from an M/M/s queuing system, which is determined by the value function $V_{t,i}$:

$$V_{t,i}(S_t) = \tag{1}$$
$$\underset{x_{t,i}}{\text{Max}}(C_t(S_t, x_{t,i}) + \Omega(V_{t,1}, \ldots, V_{t,i-1}, V_{t,i+1}, \ldots, V_{t,\Delta}, E[V_{t+1} | S_t])),$$

where $\Delta$ is the quantity of link components for which decisions must be made, $C_t$ is the immediate payoff from decision $x_t$ under state $S_t$, $\Omega$ is approximated customer delay (during the current state $S_t$ and the future state $S_{t+1}$) derived from the M/M/s queuing system, and the entire expression is divided into customer delay (in terms of the cruising time) and system cost (in terms of occupancies of the parking facilities).

Illustrative embodiments utilize a non-myopic smart parking mechanism, as will now be described. We formulate the non-myopic atomic game to address parking competition through allocation of candidate parking facilities to travelers which considers differences in travel times for the vehicles, walking distances, dynamic pricing, cruising times, and occupancies of the parking facilities. Note that the travelers compete for parking spaces that minimize the travel cost, so the linear integer model assigns the temporary parking preference according to their goals. To emphasize the scalability of the disclosed parking game in illustrative embodiments, linear integer programming (LIP) is used to consider travel costs in a manner that advantageously avoid computational complexity, resulting in a faster algorithm implementation as compared to other approaches.

With regard to customer travel cost, we present a linear integer optimization model for parking allocation that considers travel costs in the context of a scalable non-myopic atomic game in a smart parking system.

We characterize the linear integer parking allocation problem as follows in illustrative embodiments.

Assume there are M parking facilities in the network, $m=1, 2, 3, \ldots M$, where parking facility m has an available capacity of $c_m$. Let $\Delta\tau$ denote the time horizon into T which is partitioned to time intervals $1, \ldots, T$. In the transportation network, traveler n has an assumed point of origin and an assumed destination and wishes to choose the best road route, which is dependent on roadway congestion. We calculate the travel costs for the travelers and update the utility function in order to find effective arrival rates as described below.

The objective of the system is to allocate parking spaces to a large number of travelers, as well as to minimize the costs of traveler n measured by travel times (i.e., for each m, the time $t_{nm}$ required for traveler n to get from his or her point of origin to parking facility m) and walking times (i.e., for each m, the distance $w_{nm}$ from parking facility m to the destination). The composite travel cost of traveler n to parking facility m is estimated as the sum of the travel time for driving from the location of origin to parking facility m and the walking time from parking facility m to the destination.

Problem 1—Example Linear Optimization Problem
Notation:
n: users with parking requests ($n=1, 2, 3, \ldots, N$).
m: parking facilities ($m=1, 2, 3, \ldots, M$).
Inputs:
$w_{nm}$: walking time for user n from parking facility m to the traveler's destination
$t_{nm}$: travel time for user n from point of origin to parking facility m.
$c_m$: available parking spaces in parking facility m $$\text{Min} f = \sum_{n=1}^{N} \sum_{m=1}^{M} (t_{nm} + w_{nm}) x_{nm} \tag{2}$$

Subject to:

$$\sum_{m=1}^{M} x_{nm} = 1 \quad n = 1, 2, \ldots, N \tag{3}$$

$$\sum_{n=1}^{N} x_{nm} \leq c_m \quad m = 1, 2, \ldots, M \tag{4}$$

$$x_{nm} \geq 0, \tag{5}$$

where $x_{nm}$ is a binary variable that indicates whether parking facility m is allocated to user n. The first constraint states that one and only one parking facility is to be assigned to each user, also referred to below as a "traveler," a "vehicle" or a "customer," which guarantees that every user's request is accepted by the system. The capacity constraints (4) guarantee that parking facilities are occupied by no more than their respective maximum $c_m$ vehicles. By solving Problem 1, the optimal value of objective function for assigning traveler n that selects parking facility m can be defined by $f^*{}_m{}^n$.

Hence, Problem 1 considers the utility $f^*{}_m{}^n$ as the potential parking assignment that includes travel time and walking time for each individual traveler from his or her location of origin to the destination. We run Problem 1 to calculate the difference of travel times for each traveler from the point of origin until the smart parking system assigns parking facilities to the traveler. Note that the assignment of parking facilities and the utility function are updated by joining each new arrival over time. The probability that user n selects parking facility m, $p_m{}^n$, where $\Sigma_{m=1}^{M} p_m{}^n = 1$, is given by the MNL model:

$$p_m^n = \frac{e^{-f_m^{*n}}}{\sum_m e^{-f_m^{*n}}} n = 1 \ldots, N, m = 1 \ldots, M \tag{6}$$

During time interval $\Delta\tau$, the number of parking requests for a vehicle n follows a Poisson distribution with mean $\bar{\lambda}_n p_m{}^n$:

$$\lambda_m = \frac{1}{\Delta\tau} \sum_{n=1}^{N} \bar{\lambda}_n p_m^n \tag{7}$$

We are assuming an exponentially distributed service time with a mean $1/\sigma_m$, regardless of whether a vehicle is located in parking facility m during the entire interval $\Delta\tau$. The number of open spaces in an M/M/$s_m$ queuing system is $s_m$, which is calculated by the number of available parking spaces $c_m$ and the average of vehicles going out during the entire interval, $\Delta\tau\vartheta_m\sigma_m$. Thus, the expected number of available spaces in facility m in time interval $\Delta\tau$ is $s_m = c_m + \Delta\tau\vartheta_m\sigma_m$, where $\vartheta_m$ is the number of occupied spots in parking facility m during that time interval.

In some embodiments, a socially efficient price for a parking mechanism is determined in the following manner. We calculate the queue-joining threshold $k_m^*$ that maximizes the welfare function Z, where RD ($\xi$) is the reward function which is calculated by multiplying a reward of R and the demand function $D(\xi)$. The customer waiting time $N(\xi)$ is based on balking level $M/M/s_m/k_m$, where $\psi N(\xi)$ is the rate at which the delay is incurred, where $\psi$ is the value of time. It can be attained by the customer threshold strategy $k_m^*$ that maximizes Z, which a simple one-dimensional line search can determine.

$$Z = RD(\xi) - \psi N(\xi) = \Lambda R \frac{1 - \rho_m^{k_m}}{1 - \rho_m^{k_m+1}} - \psi \left( \frac{P_0^B a^{s_m} \rho_m}{s_m!(1-\rho_m)^2} [1 - \rho_m^{k_m-s_m+1} - (1-\rho_m)(k_m+1)\rho_m^{k_m-s_m}] \right), \quad (8)$$

where $$P_0^B = \left[ \frac{a^{s_m}}{s_m!} \left( \frac{1 - \rho_m^{k_m-s_m+1}}{1 - \rho_m} \right) + \sum_{n=0}^{s_m-1} \frac{a^n}{n!} \right]^{-1}, \quad (9)$$

where $\hat{\mu}_m = s_m \sigma_m$, $a = \frac{\lambda_m}{\sigma_m}$, and $\rho_m = \frac{\lambda_m}{\hat{\mu}_m}$.

Hence, the dynamic price is calculated and is then given by:

$$\xi_m^{*n} = R - \frac{k_m^* + 1}{s_m \sigma_m} \quad (10)$$

We now update the probability that vehicle n chooses parking facility m by including the optimal price:

$$p_m^n = \frac{e^{-\left( \alpha_1 \bar{f}_m^{*n} + \alpha_2 \bar{\xi}_m^{*n} \right)}}{\sum_m e^{-\left( \alpha_1 \bar{f}_m^{*n} + \alpha_2 \bar{\xi}_m^{*n} \right)}} n = 1 \ldots, N, m = 1 \ldots, M, \quad (11.a)$$

where $\alpha_1$ and $\alpha_2$ are parameters that differentiate the travel cost (in terms of the walking time and travel time) from the dynamic price. In further description below, we evaluate the performance of different parking strategies by considering the travel cost or the cheapest first strategy.

Prior to solving the probability in (11.a), the travel cost and prices are normalized as follows:

$$\bar{f}_m^{*n} = \frac{\left( f_m^{*n} - [f_m^{*n}]_{min} \right)}{\left( [f_m^{*n}]_{max} - [f_m^{*n}]_{min} \right)} \in [0, 1] \quad (11.b)$$

$$\bar{\xi}_m^{*n} = \frac{\left( \xi_m^{*n} - [\xi_m^{*n}]_{min} \right)}{\left( [\xi_m^{*n}]_{max} - [\xi_m^{*n}]_{min} \right)} \in [0, 1] \quad (11.c)$$

Using the travel cost, queue-joining threshold, optimal price, and finally the probability that user n selects parking facility m, we now update the arrival rate for parking facility $\lambda_m$ (see Equation (7)).

An example parking demand function will now be described in more detail. In establishing a game model for a smart parking mechanism, an immediate challenge is to determine the connection between parking prices and effective arrival rates. Let $\Lambda$ denote the aggregate arrival rate that is distinguished from an individual arrival $\lambda$, $0 < \lambda \le \Lambda$, where the travelers want to join the queue. The demand function is calculated by the gambler's ruin probability, where a customer will join the system and eventually receive a reward of R. From queueing theory, the probability is calculated by $$\left( \frac{1 - \rho_m^{k_m}}{1 - \rho_m^{k_m+1}} \right).$$

Therefore, the demand function is $$D = \Lambda \left( \frac{1 - \rho_m^{k_m^*}}{1 - \rho_m^{k_m^*+1}} \right), \quad (12)$$

where $k_m^* = s_m \sigma_m (R - \xi_m^{*n}) - 1$, and the probability that vehicle n selects parking facilities m is $p_m^n$ (updated by Equation (11)). RD is the rate at which the reward is received. Alternatively, for a revenue-maximizing price, the traveler should pay the price $\xi^*$ that maximizes the expected revenue rate $\xi D$. It derives the queue-joining threshold $k_m^*$ that maximizes the revenue function.

An example of computation of cruising time will now be described. Based on the problem definition, we compute the cruising time in this embodiment under infinite-horizon look-ahead. Thus we calculate the relative value of customer delay during time intervals for the current state and the future state. Based on the blocking probability that an incoming vehicle joins the queue and all parking facilities are unavailable at parking facility m for an $M/M/s_m$ queuing system, the relative value of user delay during the current state can be defined by the following function:

$$\delta_m = \begin{cases} \frac{\left( \frac{(s_m \rho_m)^{s_m}}{s_m!} \right)\left( \frac{1}{1 - \rho_m} \right)}{\sum_{i=0}^{s_m-1} \frac{(s_m \rho_m)^i}{i!} + \left( \frac{(s_m \rho_m)^{s_m}}{s_m!} \right)\left( \frac{1}{1 - \rho_m} \right)} & \text{if } \rho_m < 1 \\ 1 & \text{if } \rho_m \ge 1 \end{cases} \quad (13)$$

In the smart parking system of the present embodiment, the probability that vehicle n selects parking facility m is $p_m^n$. Thus the vehicles will be divided into two groups: those that are assigned to a parking facility, with probability $1 - \sum_{m=1}^M p_m^n \delta_m$, and those that are not yet assigned, with probability $\sum_{m=1}^M p_m^n \delta_m$. The new travelers arriving through time interval $(0, d)$, denoted by $\varkappa$, follow a Poisson distribution with parameter $\lambda d$, $\varkappa \sim \text{Poisson}(\lambda d)$. We now consider time interval $(d, \infty)$. At time t, the initial n travelers have departed and the number of travelers in the queue is $\varkappa$. Applying the memoryless property, the expected number of travelers in the queue (derived from the probability that $\varkappa > s_m$ and the probability that $\varkappa \le s_m$) is $$E[\varkappa] = \frac{\lambda_m d}{2} = \frac{\lambda_m \left( \sum_{m=1}^M p_m^n \delta_m \right) s_m}{2}.$$

Thus, the contribution to the relative value for $\varkappa \leq s_m$ during the future state is as follows:

$$E[V_{\mathcal{H}}] = \sum_{i=0}^{s_m} P\{\mathcal{H} = i\}V(i) = \frac{w}{\lambda_m}\sum_{i=1}^{\mathcal{H}}\sum_{k=0}^{i-1}\frac{(i-1)!}{(i-k-1)!}\left(\frac{\lambda_m}{\sigma_m}\right)^{-k} - \frac{1}{\lambda_m}\sum_{i=1}^{\mathcal{H}}(i-1)\sum_{k=0}^{i-2}\frac{(i-2)!}{(i-k-2)!}\left(\frac{\lambda_m}{\sigma_m}\right)^{-k} \quad (14.a)$$

Let $\rho_m = \frac{\lambda_m}{\hat{\mu}_m}$ and $\mathcal{H} = \frac{\lambda_m d}{2}$ (where $\varkappa$ is based on the Poisson parameter $\lambda d$ under two possible sets: $\varkappa \leq s_m$ and $\varkappa > s_m$). For $>s_m$, we have $$E[V_{\mathcal{H}}] = \sum_{i=s_m}^{\infty} P\{\mathcal{H} = i\}V(i) = \quad (14.b)$$

$$V(s_m) - \frac{(\mathcal{H} - s_m)\rho_m}{1-\rho_m}\frac{w}{\lambda_m} + \left[\frac{(\mathcal{H} - s_m)(\mathcal{H} - s_m + 1)\rho_m}{2(1-\rho_m)} + \frac{(\mathcal{H} - s_m)(\rho_m + s_m(1-\rho_m))\rho_m}{(1-\rho_m)^2}\right]\frac{1}{\lambda_m} + \frac{\left(\frac{1}{\rho_m}\right)^{\mathcal{H}-s_m} - 1}{1 - \rho_m}$$

$$\left[\frac{\rho_m}{1-\rho_m}\frac{w}{\lambda_m} + V(s_m) - V(s_m - 1) - \frac{(\rho_m + s_m(1-\rho_m))\rho_m}{\lambda_m(1-\rho_m)^2}\right]$$

where w is the average traveler waiting time for service based on an M/M/$s_m$ queue that considers the probability of a traveler being delayed:

$$w = \frac{(s_m\rho_m)^{s_m}\rho_m}{s_m!(1-\rho_m)^2}\left[\sum_{n=0}^{s_m-1}\frac{(s_m\rho_m)^n}{n!} + \frac{(s_m\rho_m)^{s_m}}{s_m!(1-\rho_m)}\right]^{-1} + s_m\rho_m \quad (14.c)$$

In order to find the global solutions, a social welfare function, as described below, is established by involving the reward, the system cost, and the cruising time for travelers, which finally determine the optimal parking assignment.

An example social welfare function will now be described in more detail. The policy in this embodiment is to assign a parking facility with an updated future state based on maximizing the additional social welfare over all parking facilities as a result of a new traveler joining and competing for a parking space, considering the approximate user delay over a long-term time horizon. Based on Equation (1), the social welfare function (as shown in Equation (15.b)) is formulated by considering approximate delay over long-term time horizon using the reward function, the new dynamic pricing framework, the system cost (in terms of occupancies of the parking facilities), and the relative value of the customer's cost (in terms of cruising times). A weight that differentiates the objectives, denoted by $\theta$, $0 \leq \theta \leq 1$, and $\beta$, is the policy parameters that differentiate between myopic and non-myopic policies. We want to solve $$\{m^*, n^*, \xi_m^{n*}\} = \arg\max_{m,n,\xi_m^n}[SW(m,n,\xi_m^n) - SW(m, n-1, \xi_m^n)], \quad (15.a)$$

where $SW(m,n,\xi_m^n)$ denotes the social welfare:

$$SW(m, n, \xi_m^n) = \Lambda R\left[\frac{1-\rho_m^{k_m}}{1-\rho_m^{k_m+1}}\right] - \quad (15.b)$$

$$\theta\left[\frac{s_m\left(1 - \sum_{m'=1}^{m} p_{m'}^n \delta_{m'}\right) - \xi_m^n}{s_m(1 - \sum_{m'=1}^{m} p_{m'}^n \delta_{m'})}\right] - (1-\theta)\left[\frac{\lambda_m \delta_m + \beta E[V_{\mathcal{H}}] + \xi_m^n}{s_m\left(1 - \sum_{m'=1}^{m} p_{m'}^n \delta_{m'}\right)}\right]$$

Subject to:

$$\sum_{m=1}^{M} p_m^n = 1 \quad (15.c)$$

$$\lambda_m = \frac{1}{\Delta\tau}\sum_{n=1}^{N}\bar{\lambda}_n p_m^n \quad (15.d)$$

$$0 \leq \lambda_m \leq \Lambda, \quad (15.e)$$

where $\delta_m$ and $E[V_{\mathcal{H}}]$ are calculated by Equations (13) and (14), respectively. The first term of Equation (15.b) is the reward function. The second term is the system cost (those that are assigned to a parking facility, with probability $1-\sum_{m'=1}^{m} p_{m'}^n \delta_{m'}$) which is calculated in terms of the number of vehicles assigned to a parking facility $s_m(1-\sum_{m'=1}^{m} p_{m'}^n \delta_{m'})$. The third term is the amount of cruising time during the current period $\lambda_m \delta_m$, and the future period $E[V_{\mathcal{H}}]$. We also divide both costs by the total assigned parking facility to guarantee the units are the same as the benefits. Once we have formulated Equations (15), we run the following resource allocation algorithm in the present embodiment.

Algorithm 1—Example Dynamic Parking Game
1. Update the smart parking system such as requests, customer locations and statuses of the assignment of each traveler from the time of arrival of the prior traveler.
2. For each traveler n and parking facility m,
   (a) Solve the linear parking allocation problem (Problem 1) to obtain the potential parking assignments that consider travel costs (travel time and walking time). Note that we are looking for local solutions in this step. Also determine $p_m^n$ using Equation (6), and determine $\lambda_m$ using Equation (7).
   (b) Determine the dynamic prices $\xi^*{}_m^n$ using Equation (10). At this point, we are looking for global solutions by updating $p_m^n$ using Equation (11) and updating $\lambda_m$ using Equation (7).
3. Using the updated information $p_m^n$ and $\lambda_m$, $k_m^*$, and $\xi^*{}_m^n$ determine the reward function (the demand function can also be computed using Equation (12)).
   (a) Determine system cost (in terms of occupied parking spaces) and cruising times during current state and future state.
   (b) Determine $SW(m, n, \xi_m^n)$.
4. Assign the new traveler to a parking facility when he or she is within a designated threshold distance (e.g., 1 km) of his or her destination, at which time the traveler is assigned to the parking facility m that maximizes the difference in the values of the social welfare functions in Equation (15a), where the threshold distance is illustratively a positive value which is defined by the smart parking system. Update the results by using that assignment for the new traveler and the existing assignments for the other travelers.

In the above-described embodiment, we calculated the aggregate demand function using the probability that a traveler wants to join the system, dynamic pricing with the assumption of elastic demand, a queue-joining threshold, and the capacity of service. We also considered the individual customer arrivals to calculate interests or welfare that are reflected into a collective decision such as social welfare.

Experimental results will now be described with reference to FIGS. 5 through 8.

Numerical calculations were performed to verify the efficiency of an example implementation of the disclosed smart parking system in a real-world application. As will be described, it was found that the parking game model achieved better results compared to other parking strategies. In the following, we demonstrate a replicable example to show the input parameters and outputs of the disclosed parking approach, and then show the results of a simulation of the smart parking system that was operated to test the applicability of the parking game model using actual parking data for San Francisco. The simulations of the parking strategies were run in Matlab R2018a on a computer with an Intel Core i5-2450 CPU with 2.5 GHz and 8 GB of RAM, running on a 64-bit Windows 10 operating system.

For the numerical example, the following parameters were used for testing the parking mechanism with a look-ahead policy: $\Lambda=2$, $R=\$4$, $\psi=0.33$, $\lambda=2$, $\hat{\mu}=1$, vehicle speed=4/6 (km/min), walking speed=2/60 (km/min), $M=10$, $\Delta\tau=1$ min, $\theta=0.5$, and $\alpha_1=\alpha_2=1$. The efficiency of the dynamic parking mechanism depends on the selected value of $\beta$ between 0.01 and 1. Note that the value of $\beta=0.08$ produces the most effective results where the coefficient of relative value for future states is $\beta/s_m(1-\Sigma_{m'=1}{}^n p_m{}^n \delta_{m'})$. Table 1 below presents the results of the parking assignments for 20 travelers under the example non-myopic parking strategy including the requested and assigned times, as well as the social welfare, walking distance, and price of parking, for each vehicle.

TABLE 1

Parking Output Results

| Traveler | Requested time (min) | Assigned time (min) | Parking Facilities | Price ($\xi$) | Walking distance (m) | SW |
|---|---|---|---|---|---|---|
| 1 | 4.076 | 4.448 | 1 | $3.475 | 456.773 | 7.322 |
| 2 | 4.210 | 4.550 | 1 | $3.406 | 149.285 | 7.378 |
| 3 | 4.240 | 4.398 | 1 | $2.708 | 29.681 | 7.499 |
| 4 | 4.289 | 4.322 | 5 | $3.894 | 40.249 | 7.480 |
| 5 | 4.779 | 5.1434 | 2 | $3.798 | 294.064 | 7.483 |
| 6 | 5.844 | 6.092 | 9 | $3.809 | 23.193 | 7.497 |
| 7 | 12.328 | 12.428 | 5 | $3.840 | 164.652 | 7.497 |
| 8 | 13.112 | 13.376 | 10 | $3.342 | 40.223 | 7.499 |
| 9 | 13.509 | 13.795 | 10 | $3.333 | 61.845 | 7.498 |
| 10 | 13.694 | 14.230 | 4 | $3.905 | 334.676 | 7.496 |
| 11 | 13.701 | 13.835 | 3 | $3.994 | 313.719 | 7.495 |
| 12 | 15.278 | 15.660 | 9 | $3.614 | 333.740 | 7.499 |
| 13 | 17.031 | 17.252 | 4 | $3.894 | 317.928 | 7.494 |
| 14 | 18.043 | 18.415 | 9 | $3.603 | 43.381 | 7.497 |
| 15 | 20.599 | 21.232 | 4 | $3.893 | 278.432 | 7.486 |
| 16 | 20.730 | 21.028 | 2 | $3.409 | 546.345 | 7.494 |
| 17 | 21.826 | 22.111 | 3 | $3.994 | 478.796 | 7.494 |
| 18 | 22.251 | 22.391 | 9 | $3.596 | 335.424 | 7.490 |
| 19 | 23.080 | 23.726 | 3 | $3.994 | 845.824 | 7.492 |
| 20 | 23.591 | 23.847 | 3 | $3.993 | 352.587 | 7.495 |

For the simulations, we used parking data for San Francisco (SF) as of April of 2017 (parking data shared by SFpark), when there were 441,950 publicly available parking spaces citywide, including both on-street and off-street (garages and lots) spaces. The total numbers of on-street and off-street spaces were 275,450 and 166,500, respectively. These numbers do not include private parking at houses, apartment buildings, and businesses. The SF parking data file contains about 1397 records, which includes data on parking locations, capacities, and related details of public parking garages and lots. In this paper, all the tests were shown using parking data for two zones with high congestion in the downtown SF area (zone C-3-S and zone C-3-R). The road network in those zones was used as the testbed for setting up our experiments. There was a total of six parking garages and 23 on-street parking lots in the two zones.

The input parameters $\overline{\lambda}_n$ and $\hat{\mu}$ are exogenous and were approximated from an SFpark dataset. We determined the number of traveler arrivals during each hour in a 24-hour period, averaged over seven days, for both on-street parking lots and parking garages. The service rate is defined based on the time between an assignment of a traveler to a parking space and the time at which they left the spot. We also determined the service rates during each hour in a 24-hour period, averaged over seven days, for both on-street parking lots and parking garages.

We compare the efficiency of an example of the non-myopic parking strategy disclosed herein to that of five other strategies over 30 randomly simulated runs.

The six policies that were evaluated on each of the 30 runs of the simulations were as follows:

1. PS(non-myopic), the example non-myopic parking strategy under $\beta=0.08$;

2. PS(myopic), a myopic parking strategy under $\beta=0$;

3. PS(w,c), a nearest-first strategy, by which parking spaces are allocated according to travelers' walking distances and cruising times;

4. PS(p,c), a cheapest-first strategy, by which parking spaces are allocated according to travelers' parking prices and cruising times;

5. PS(w,pr), a revenue-maximizing price that accounts for neither customer delay nor cruising time (the traveler should pay the price $\xi^*$ that maximizes the expected revenue function $\xi D$) and the vehicle tracks the minimum walking distance to check the availability of parking; and 6. PS(w,ps), a static price (fixed price—$4) that accounts for neither customer delay nor cruising time and the traveler tracks the minimum walking distance to check the availability of parking.

Using the SFpark data, we evaluated the parking system in the study area for a one-hour period (7 p.m. to 8 p.m.) with 30 simulated runs and 200 passenger arrivals. We also compare the average social welfare for the three peak hours in the morning between 10 AM to 11 AM. For each of the six parking strategies, we determined the number of cruising travelers, the average walking cost per vehicle, the average price of space per vehicle, and the average social welfare per vehicle.

As indicated above, it was generally found that the example non-myopic smart parking strategy with non-zero $\beta=0.08$ value can significantly improve the system performance. Other implementations of non-myopic smart parking strategies as disclosed herein can be used, with different parameters and parameter values.

Figure 5:
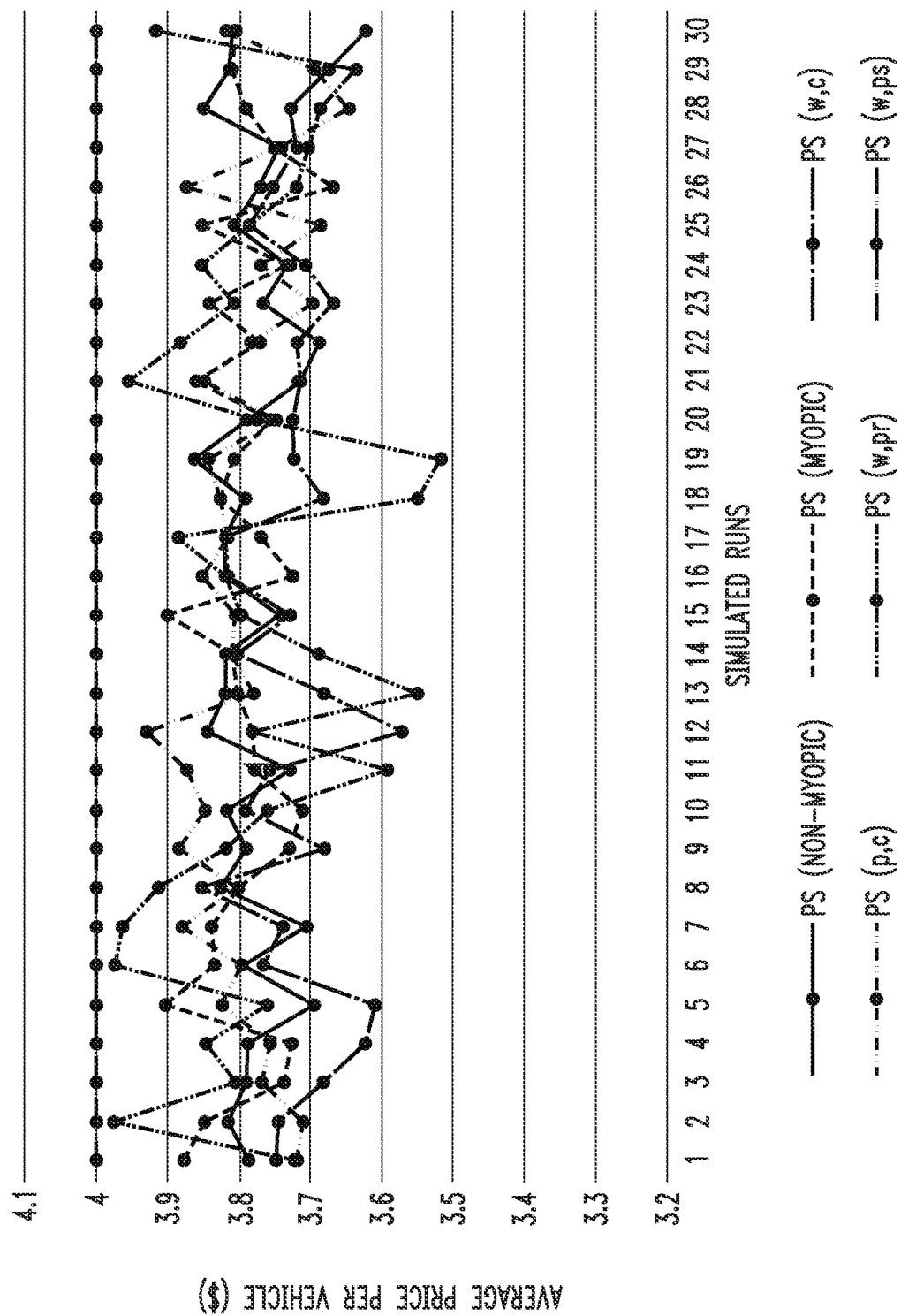
FIGS. 5 through 8 are graphical plots comparing performance of different parking strategies in a smart parking system in illustrative embodiments.

FIG. 5 shows average price of parking per vehicle under the different parking strategies, including the example non-myopic strategy that accounts for traveler waiting times.

More particularly, FIG. 5 shows the dynamic price for the example non-myopic strategy PS(non-myopic) and the prices for the other five strategies (PS(myopic), PS(w,c), PS(p,c), PS(w,pr), and PS(w,ps)). Under the example non-myopic parking strategy, the average walking distance per vehicle decreases by 1.26%, 4.99%, 2.25%, 16.90%, and 17.54%, respectively, compared to the other five strategies.

Figure 6:
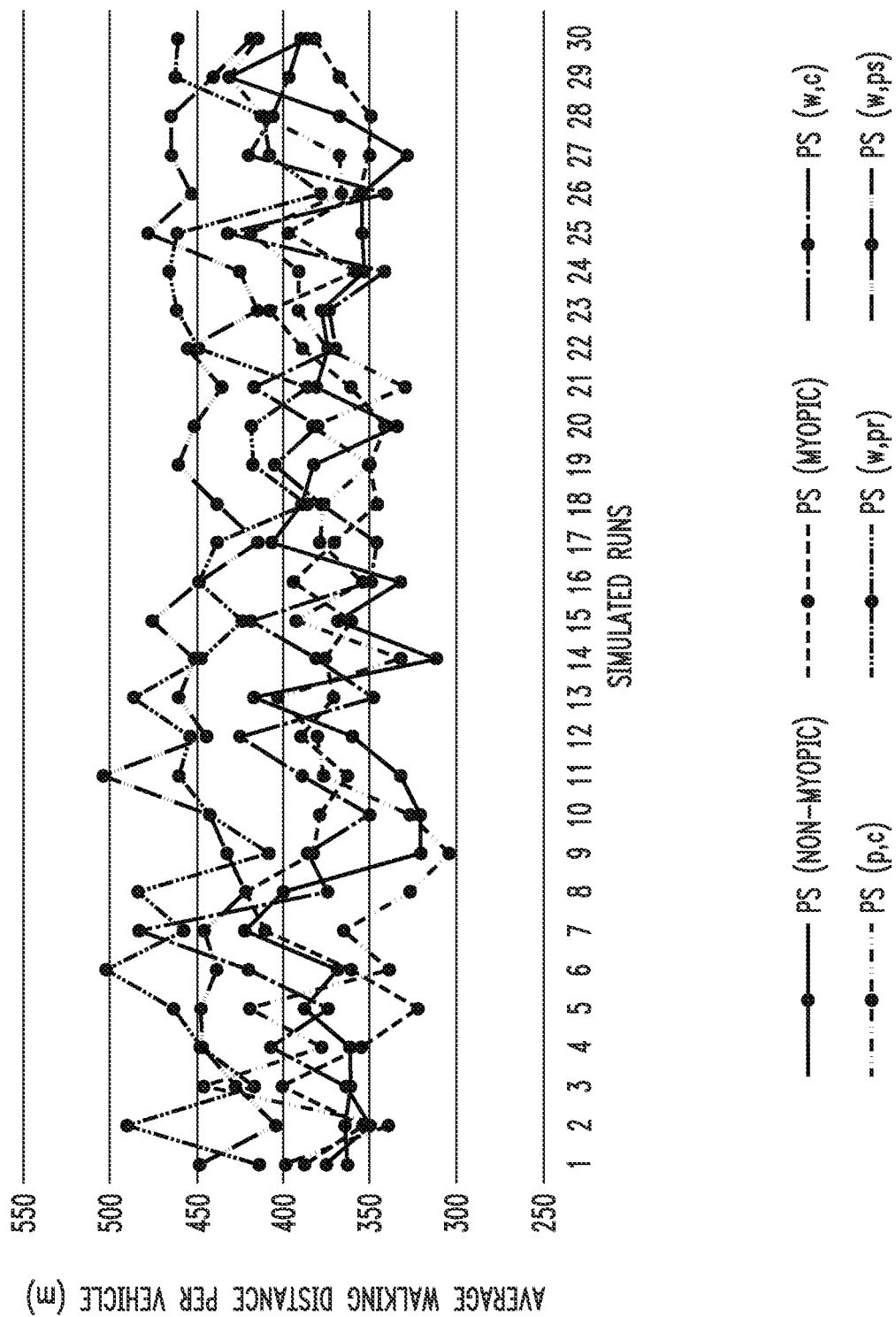

FIG. 6 displays the simulation results for the average walking distance per individual vehicle under the different parking strategies.

Figure 7:
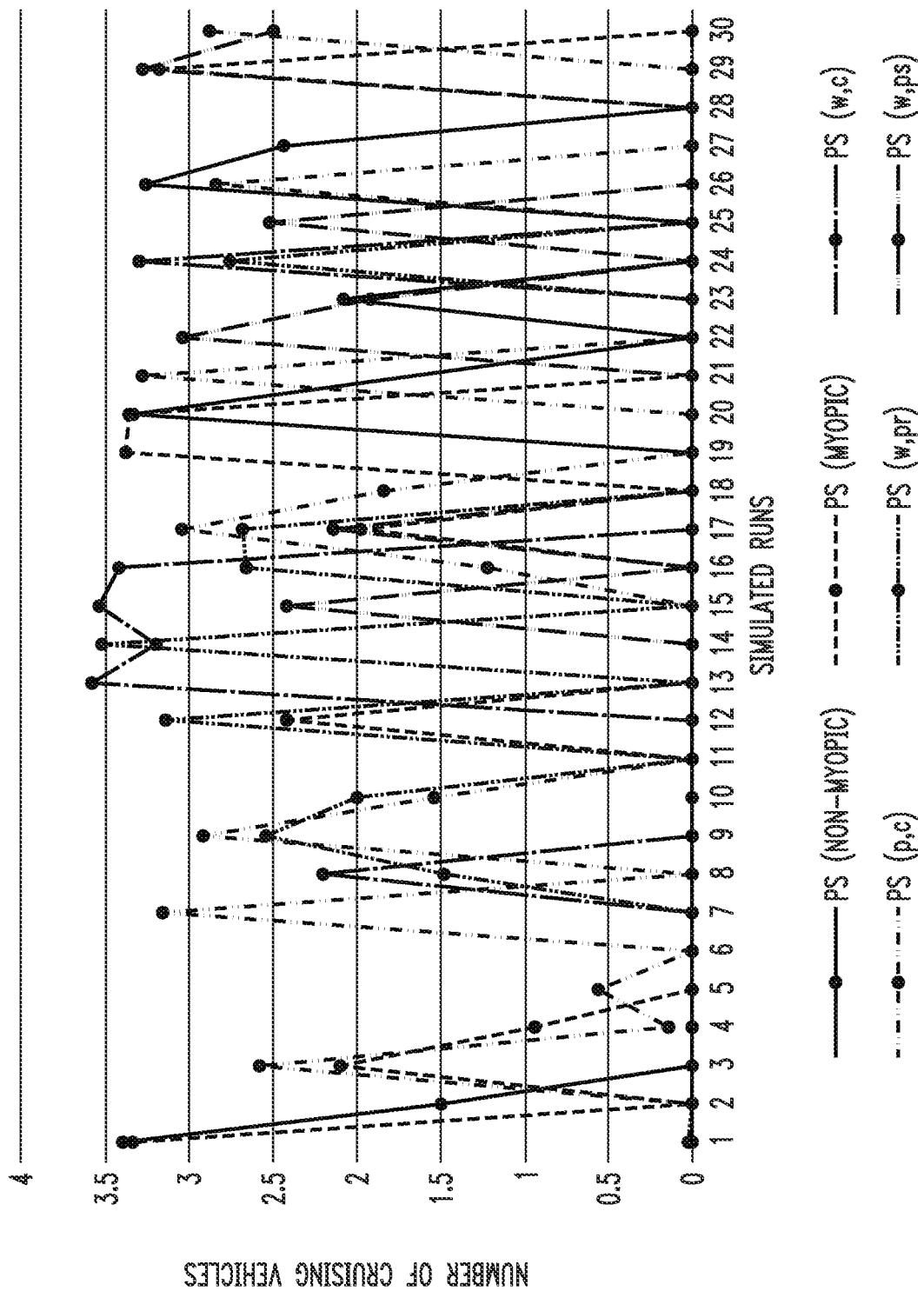

FIG. 7 shows the number of cruising vehicles under the different parking strategies used in the simulations. Under the example non-myopic parking strategy, the number of cruising vehicles is reduced by 22.61%, 16.74%, 38.43%, 22.98%, and 10.10%, respectively, compared to the other five parking strategies. Nevertheless, there is relatively little difference (close to zero) in the number of cruising vehicles for some points. The average cruising distance (in meters) per traveler is 678.599 for PS(non-myopic), 1182.202 for PS(myopic), 1028.965 for PS(w,c), 1893.280 for PS(p,c), 1476.123 for PS(w,pr), and 1079.3219 for PS(w,ps). This shows that the example non-myopic parking strategy reduces the average cruising distance per vehicle by 42.60%, 34.05%, 64.16%, 54.02%, and 37.12%, respectively, compared to the other five strategies.

Figure 8:
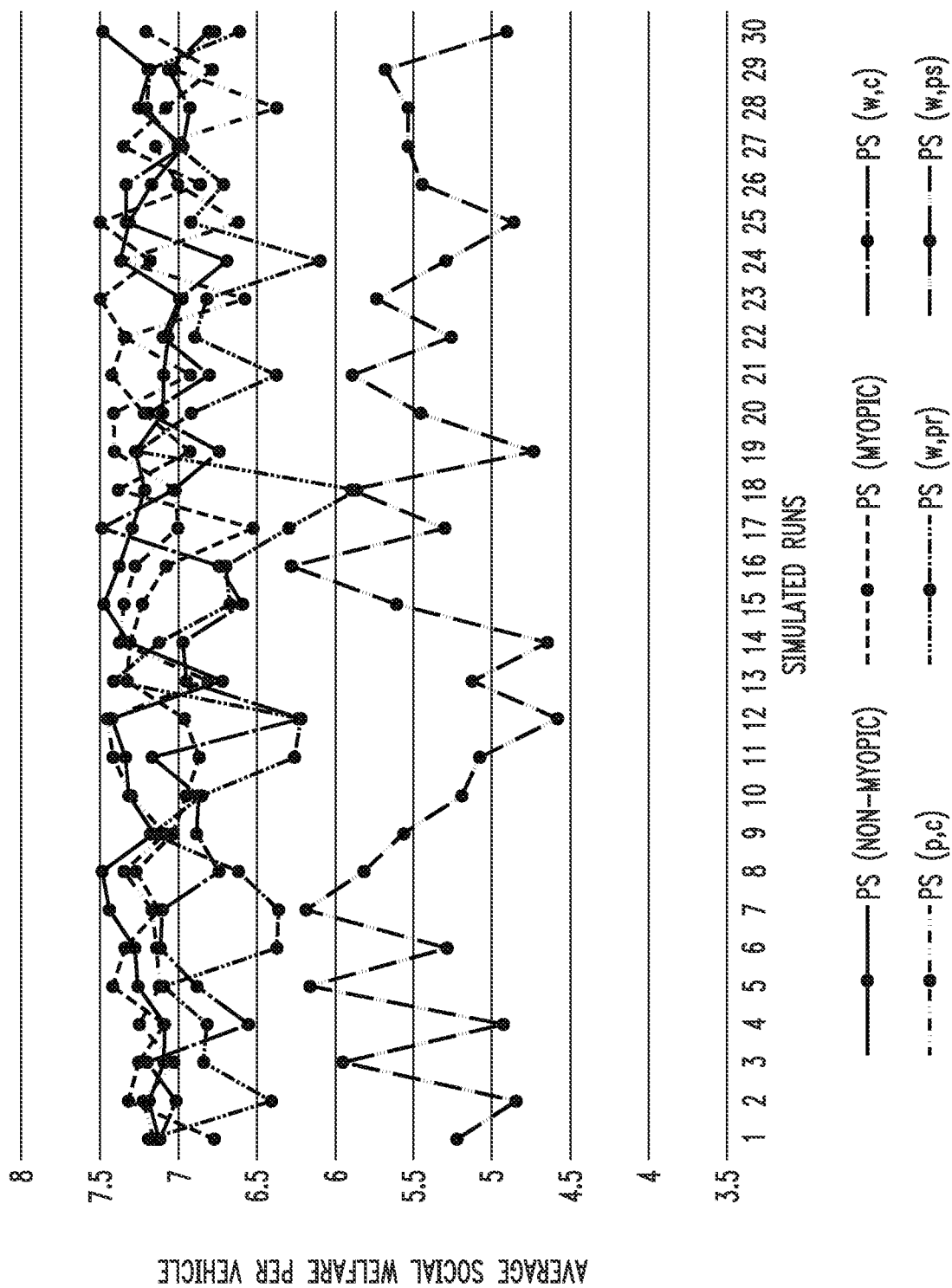

FIG. 8 shows the average social welfare per vehicle under the different parking strategies, over 30 simulated runs. It indicates that the example non-myopic parking strategy can increase the average social welfare per vehicle by 1.04%, 3.96%, 1.59%, 6.73%, and 25.30%, respectively, compared to the PS(myopic), PS(w,c), PS(p,c), PS(w,pr), and PS(w,ps) strategies. Table 2 below displays the average performance of the different parking strategies. It can be seen there that the example non-myopic parking strategy is better than the other five parking strategies in terms of social welfare. These experimental results demonstrate that smart parking mechanisms as disclosed herein can improve the overall level of service compared to policies that neither incorporate actual parking data nor adopt a dynamic pricing policy.

TABLE 2

Performance of Different Parking Strategies

| Parking Strategy | Avg. SW per vehicle | Relative difference in Avg. SW (%) | Avg. cruising distance (m) | Avg. price of parking per vehicle ($) | Avg. walking distance per vehice (m) |
|---|---|---|---|---|---|
| PS(non-myopic) | 7.229 | — | 678.599 | 3.785 | 367.036 |
| PS(myopic) | 7.154 | 1.04 | 1182.202 | 3.795 | 371.706 |
| PS(w, c) | 6.953 | 3.96 | 1028.965 | 3.722 | 386.298 |
| PS(p, c) | 7.115 | 1.59 | 1893.280 | 3.794 | 375.470 |
| PS(w, pr) | 6.742 | 6.73 | 1476.123 | 3.781 | 441.688 |
| PS(w, ps) | 5.399 | 25.30 | 1079.319 | 4 | 445.105 |

We modeled the social welfare function using a reward function and operational cost functions for both customers and the system. Table 3 below shows the average of social welfare per traveler under different parking policies across the other peak hours in our experiments. Specially, in the peak hour (10 AM to 11 AM) the average of social welfare per vehicle under the example non-myopic parking strategy is significantly increased by 6.3%, 50.47%, 40.32%, 48.76%, and 54.63%, respectively, compared to the PS(myopic), PS(w,c), PS(p,c), PS(w,pr), and PS(w,ps) strategies. The results further indicate that the average social welfare for a one-hour period (9 AM to 10 AM) will increase by 3.04%, 25.53%, 9.60%, 24.29%, and 43.03% respectively by applying the non-myopic policy rather than the other five parking policies. Correspondingly, the average of social welfare per vehicle between 8 AM and 9 AM will increase by 2.22%, 21.20%, 5.16%, 23.58%, and 30.15%, respectively, as compared the other five parking strategies.

TABLE 3

Average Social Welfare per Vehicle under Different Parking Strategies

| | 8 AM-9 AM | | 9 AM-10 AM | | 10 AM-11 AM | |
|---|---|---|---|---|---|---|
| Parking Strategy | Avg. SW per vehicle | Relative difference (%) | Avg. SW per vehicle | Relative difference (%) | Avg. SW per vehicle | Relative difference (%) |
| PS(non-myopic) | 7.500 | — | 7.336 | — | 5.247 | — |
| PS (myopic) | 7.333 | 2.22 | 7.113 | 3.04 | 4.916 | 6.30 |
| PS(w, c) | 6.188 | 21.20 | 5.844 | 25.53 | 3.487 | 50.47 |
| PS (p, c) | 7.132 | 5.16 | 6.693 | 9.60 | 3.739 | 40.32 |
| PS (w, pr) | 5.731 | 23.58 | 5.554 | 24.29 | 2.688 | 48.76 |
| PS(w, ps) | 5.239 | 30.15 | 4.179 | 43.03 | 2.380 | 54.63 |

The example non-myopic parking strategy implements a dynamic optimization that considers the differences in travel times for the vehicles and walking times for the drivers, as well as dynamic pricing under the assumption of elastic demand, cruising times, and occupancies of the parking facilities. Such an embodiment provides a smart parking mechanism with a look-ahead component for formulation of the combined demand function, system cost, and cruising distance for parking. Using the SFpark dataset, we found that the average social welfare per vehicle improved by up to 54% compared to the other parking strategies. Also, by using the example non-myopic parking strategy, which is illustratively based on a multi-server queue system, we were able to reduce the average walking distance per vehicle by 17%. We provided empirical evidence of the effectiveness of the disclosed non-myopic parking strategy in terms of the number of cruising travelers by comparing it to other parking strategies. By employing the San Francisco parking data, we found that the disclosed model reduces the number of cruising vehicles by up to 64%. We were also able to solve a complex smart parking problem under a look-ahead policy without performing intractable computations where the travel costs, prices, and parameters are calculated by solving the exact optimization problems.

In illustrative embodiments, we modeled the social welfare function using a reward function and operational cost functions for both customers and the system. The value function is used to evaluate the customer delay during current and future states. To create an atomic game model for the resource allocation problem, an important challenge is to make a connection between prices and demands. Thus we also calculated the aggregate demand function using the probability that a traveler wants to join the system, dynamic pricing with the assumption of elastic demand, a queue-joining threshold, and the capacity of service. In addition, we integrated these variables into the smart allocation policy with regard to customer delay and the system cost in a way that will reduce environmental impacts. Therefore, the disclosed sustainable smart policy can be used as a new general framework for a wide variety of different resource allocation applications, including, for example, bicycle parking, airplane gate assignments, airport parking, multimodal transit systems, transit service switching between fixed route and flexible route, and mode/route choice problems.

It is to be appreciated that the particular process operations and other features of the resource allocation processes illustrated in FIGS. 1 through 4 are presented by way of example only, and additional or alternative arrangements of features can be used in other embodiments. For example, different game model configurations, functions and computations can be used in other embodiments.

As indicated above, illustrative embodiments provide significant advantages relative to conventional approaches.

For example, some embodiments implement a dynamic parking assignment process in which independent travelers compete in a non-myopic atomic game that takes into account their respective travel times from their respective origin points to the parking facilities and from the parking facilities to their respective destination points. Each individual traveler is a player in the game and can be satisfied by finding an optimal price, minimum walking distance, and minimum cruising time under consideration of future information that control the user-optimality. Such embodiments also consider collective decision processes and procedures by aggregating individual preferences into a social welfare function that controls the system-optimality. Additionally, we calculate the aggregate demand function using the probability that a traveler wants to join the system, dynamic pricing with the assumption of elastic demand, a queue joining threshold, and the capacity of service.

In some embodiments, a smart parking system provides enhanced performance by incorporating functions such as dynamic pricing, walking distance, cruising times, occupancies of the parking facilities, and also accounts for the differences in travel times for the vehicles through their respective origins to parking facilities.

These and other embodiments can provide substantial performance improvements over conventional systems at least in part by implementing resource allocation algorithms that are configured to achieve a balance between system performance (e.g., system-optimality) and individual behavior (e.g., user-optimality).

Illustrative embodiments are advantageously configured to solve the problem of multiple vehicles heading for the same parking space, leading to substantial reductions in cruising, as well as its associated traffic congestion and fuel consumption.

Some embodiments implement non-myopic dynamic pricing by accounting for customer waiting time under multi-server queue systems, while also considering dependency of traveler decisions using an MNL distribution.

In some embodiments, a smart parking mechanism is implemented as part of a smart parking system for placement of human-driven vehicles or AVs in available parking spaces of multiple parking facilities.

Some embodiments are also highly computationally efficient, and therefore readily scalable to large numbers of users and resources. For example, although illustrative embodiments calculate additional parking criteria for customers and operators relative to conventional approaches, the computations are configured in a manner that is scalable.

Illustrative embodiments can therefore provide a general framework for a wide variety of different resource allocations, such as bicycle parking, airplane gate assignments, airport parking, and stadium parking, and many others.

The above-described advantages are present in illustrative embodiments, but one or more such advantages may not be present in other embodiments. These particular advantages should therefore not be construed as limiting in any way.

As indicated above, the resource allocation algorithms disclosed herein are suitable for use in a wide variety of different resource allocation applications. The particular application examples described above are for purposes of illustration only, and should not be construed as limiting in any way.

Like other aspects of the illustrative embodiments disclosed herein, the particular features and functionality of smart parking systems, resource allocation algorithms and other techniques disclosed herein are presented by way of illustrative example only, and a wide variety of alternative features and functionality can be used in other embodiments.

Accordingly, the embodiments described herein are considered illustrative only, and should not be viewed as limited to any particular arrangement of features. For example, those skilled in the art will recognize that alternative processing operations and associated system entity configurations can be used in other embodiments. It is therefore possible that other embodiments may include additional or alternative system elements, relative to the elements of the illustrative embodiments. Also, the particular processing modules, resource allocation algorithms, and other system components, as well as other aspects of the illustrative embodiments, can be varied in other embodiments.

It should also be noted that the above-described information processing system arrangements are exemplary only, and alternative system arrangements can be used in other embodiments.

A given client, server, processor or other component in an information processing system as described herein is illustratively configured utilizing a corresponding processing device comprising a processor coupled to a memory. The processor executes software program code stored in the memory in order to control the performance of processing operations and other functionality. The processing device also comprises a network interface that supports communication over one or more networks.

The processor may comprise, for example, a microprocessor, an ASIC, an FPGA, a CPU, an ALU, a DSP, a GPU or other similar processing device component, as well as other types and arrangements of processing circuitry, in any combination. For example, a given precomputation and parameter determination module of a processing device as disclosed herein can be implemented using such circuitry.

The memory stores software program code for execution by the processor in implementing portions of the functionality of the processing device. A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, flash memory, ROM, magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with resource allocation and associated automated user guidance as well as other related functionality.

Processing devices in a given embodiment can include, for example, computers, servers and/or other types of devices each comprising at least one processor coupled to a memory, in any combination. For example, one or more computers, servers, storage devices or other processing devices can be configured to implement at least portions of a processing platform comprising a resource allocation algorithm and/or other system components as disclosed herein. Communications between the various elements of an information processing system comprising processing devices associated with respective system entities may take place over one or more networks.

An information processing system as disclosed herein may be implemented using one or more processing platforms, or portions thereof.

For example, one illustrative embodiment of a processing platform that may be used to implement at least a portion of an information processing system comprises cloud infrastructure including virtual machines implemented using a hypervisor that runs on physical infrastructure. Such virtual machines may comprise respective processing devices that communicate with one another over one or more networks.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Another illustrative embodiment of a processing platform that may be used to implement at least a portion of an information processing system as disclosed herein comprises a plurality of processing devices which communicate with one another over at least one network. Each processing device of the processing platform is assumed to comprise a processor coupled to a memory.

Again, these particular processing platforms are presented by way of example only, and an information processing system may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure in place of or in addition to virtualization infrastructure comprising virtual machines. Thus, it is possible in some embodiments that system components can run at least in part in cloud infrastructure or other types of virtualization infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

As indicated previously, components of the system as disclosed herein can be implemented at least in part in the form of one or more software programs stored in memory and executed by a processor of a processing device. For example, certain functionality associated with resource allocation and associated user guidance in a processing platform can be implemented at least in part in the form of software.

The particular configurations of information processing systems described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed techniques to provide additional or alternative functionality in other contexts.

It is also to be appreciated that the particular process steps used in the embodiments described above are exemplary only, and other embodiments can utilize different types and arrangements of processing operations. For example, certain process steps shown as being performed serially in the illustrative embodiments can in other embodiments be performed at least in part in parallel with one another.

It should again be emphasized that the embodiments of the invention as described herein are intended to be illustrative only. Other embodiments of the invention can be implemented utilizing a wide variety of different types and arrangements of information processing systems, processing platforms, processing modules, processing devices, processing operations and resource allocation algorithms than those utilized in the particular illustrative embodiments described herein. In addition, the particular assumptions made herein in the context of describing certain embodiments need not apply in other embodiments. These and numerous other alternative embodiments will be readily apparent to those skilled in the art.

What is claimed is:

1. An apparatus comprising:
at least one processing device comprising a processor coupled to a memory;
said at least one processing device being configured:
to detect arrival of at least a particular user in a group of a plurality of users competing for designated resources of a system;
responsive to the detected arrival, to solve a resource allocation optimization problem that considers individualized characteristics of user resource allocation requests of respective ones of the users to obtain potential assignments of respective ones of the users to respective ones of the resources;
to update one or more game model parameters based at least in part on the solution to the resource allocation optimization problem;
to update a specified look-ahead function based at least in part on the one or more updated game model parameters;

to assign the particular user to a particular one of the resources based at least in part on a difference between an updated value of the look-ahead function and a previous value of the look-ahead function, the assigning of the particular user to the particular one of the resources based at least in part on a difference between an updated value of the look-ahead function and a previous value of the look-ahead function comprising assigning the particular user to the particular resource in a manner that maximizes an increase in the updated value of the look-ahead function relative to the previous value of the look-ahead function; and to generate one or more control signals based at least in part on the assigning of the particular user to the particular one of the resources;

wherein the one or more control signals are transmitted by said at least one processing device over a network to a user device of the particular user in order to guide the particular user to the particular resource.

2. The apparatus of claim 1 wherein the look-ahead function comprises a social welfare function that is computed at least in part using:
a demand function;
a reward function comprising a product of a designated reward and the demand function;
dynamic pricing of the resources;
a performance measure for the system that comprises the resources; and
a social welfare measure.

3. The apparatus of claim 1 wherein detecting arrival of at least a particular user, solving a resource allocation optimization problem, updating one or more game model parameters, updating a specified look-ahead function, and assigning the particular user to a particular one of the resources are repeated for each of one or more additional users in conjunction with the additional user joining the group of users.

4. The apparatus of claim 1 wherein the particular user comprises a user in a group of N users, n=1, 2, ... N, the users being associated with respective ones of N vehicles, and the designated resources comprise respective ones of M parking facilities, m=1, 2, ... M, having respective capacities of available parking spaces $c_m$.

5. The apparatus of claim 4 wherein the particular user comprises a most recently arrived user in the group of N users.

6. The apparatus of claim 4 wherein assigning the particular user to a particular one of the resources based at least in part on a difference between an updated value of the look-ahead function and a previous value of the look-ahead function comprises assigning the particular user to a particular one of the M parking facilities having at least one available parking space in a manner that maximizes an increase in the updated value of the look-ahead function relative to the previous value of the look-ahead function.

7. The apparatus of claim 4 wherein the individualized characteristics considered by the resource allocation optimization problem comprise a travel time $t_{nm}$ for user n to travel from an origin point to parking facility m and a walking time $w_{nm}$ for user n to walk from parking facility m to a destination point.

8. The apparatus of claim 7 wherein the resource allocation optimization problem comprises a linear optimization problem that utilizes the travel times $t_{nm}$ and walking times $w_{nm}$ to assign each of the N users to one of the M parking facilities subject to respective capacities of available parking spaces $c_m$.

9. The apparatus of claim 8 wherein the linear optimization problem is given by:

$$\text{Min } f = \sum_{n=1}^{N} \sum_{m=1}^{M} (t_{nm} + w_{nm}) x_{nm}$$

where $x_{nm}$ is a binary variable that indicates whether or not user n is assigned to parking facility m, and wherein the linear optimization problem is constrained to assign each of the N users to only one of the M parking facilities.

10. The apparatus of claim 4 wherein the one or more game model parameters comprise a probability $p_m^n$ that user n selects parking facility m, where $\sum_{m=1}^{M} P_m^n \delta_m = 1$.

11. The apparatus of claim 10 wherein the N users are separated into first and second subsets of users, with the first subset being those users that are already assigned to one of the M parking facilities, with probability $1 - \sum_{m=1}^{M} P_m^n \delta_m$, and the second subset being those users that are not yet assigned to one of the M parking facilities, with probability $\sum_{m=1}^{M} P_m^n \delta_m$, where $\delta_m$ denotes relative value of user delay during a current queuing system state.

12. The apparatus of claim 10 wherein the probability $P_m^n$ is determined in accordance with a multinomial logit model given by:

$$p_m^n = \frac{e^{-f_m^{*n}}}{\sum_m e^{-f_m^{*n}}} \quad n = 1 \ldots, N, m = 1 \ldots, M$$

where $f_m^{*n}$ denotes a solution to the resource allocation optimization problem that assigns user n to parking facility m.

13. The apparatus of claim 10 wherein the one or more game model parameters further comprise a number of parking requests $\lambda_m$ for parking facility m that are received during a time interval $\Delta \tau$.

14. The apparatus of claim 12 wherein the number of parking requests $\lambda_m$ for parking facility m that are received during the time interval $\Delta \tau$ follows a Poisson distribution with mean $\bar{\lambda}_n p_m^n$:

$$\lambda_m = \frac{1}{\Delta \tau} \sum_{n=1}^{N} \bar{\lambda}_n p_m^n$$

under an assumption of an exponentially distributed service time.

15. The apparatus of claim 2 wherein the demand function is determined based at least in part on an aggregate arrival rate for the system comprising the resources and a probability that a user will join the group of users and eventually receive the designated reward.

16. The apparatus of claim 15 wherein the demand function is given by:

$$D = \Lambda \left( \frac{1 - \rho_m^{k_m^*}}{1 - \rho_m^{k_m^*+1}} \right)$$

where Λ denotes the aggregate arrival rate, $k_m^*$ is a queue-joining threshold that maximizes an expected revenue function, and $p_m$ is determined based at least in part on one of the game model parameters.

17. The apparatus of claim 2 wherein the dynamic pricing of the resources is determined for a user n and a parking facility m by calculating a queue-joining threshold for parking facility m that maximizes a difference between (i) the reward function as a function of resource price and (ii) a rate at which delay is incurred for user n as a function of resource price.

18. The apparatus of claim 2 wherein the performance measure for the system comprises a system cost determined as a function of occupancies of respective ones of a plurality of parking facilities.

19. The apparatus of claim 2 wherein the social welfare measure is based at least in part on cruising times for which respective ones of the users are driving respective vehicles in searching for an available parking space.

20. A method comprising:
   detecting arrival of at least a particular user in a group of a plurality of users competing for designated resources of a system;
   responsive to the detected arrival, solving a resource allocation optimization problem that considers individualized characteristics of user resource allocation requests of respective ones of the users to obtain potential assignments of respective ones of the users to respective ones of the resources;
   updating one or more game model parameters based at least in part on the solution to the resource allocation optimization problem;
   updating a specified look-ahead function based at least in part on the one or more updated game model parameters;
   assigning the particular user to a particular one of the resources based at least in part on a difference between an updated value of the look-ahead function and a previous value of the look-ahead function, the assigning of the particular user to the particular one of the resources based at least in part on a difference between an updated value of the look-ahead function and a previous value of the look-ahead function comprising assigning the particular user to the particular resource in a manner that maximizes an increase in the updated value of the look-ahead function relative to the previous value of the look-ahead function;
   generating one or more control signals based at least in part on the assigning of the particular user to the particular one of the resources; and
   transmitting the one or more control signals over a network to a user device of the particular user in order to guide the particular user to the particular resource;
   wherein the method is performed by at least one processing device comprising a processor coupled to a memory.

21. The method of claim 20 wherein the look-ahead function comprises a social welfare function that is computed at least in part using:
   a demand function;
   a reward function comprising a product of a designated reward and the demand function;
   dynamic pricing of the resources;
   a performance measure for the system that comprises the resources; and
   a social welfare measure.

22. The method of claim 20 wherein the particular user comprises a user in a group of N users, n=1, 2, . . . N, the users being associated with respective ones of N vehicles, and the designated resources comprise respective ones of M parking facilities, m=1, 2, . . . M, having respective capacities of available parking spaces $c_m$.

23. A computer program product comprising a non-transitory processor-readable storage medium having stored therein program code of one or more software programs, wherein the program code when executed by at least one processing device causes said at least one processing device:
   to detect arrival of at least a particular user in a group of a plurality of users competing for designated resources of a system;
   responsive to the detected arrival, to solve a resource allocation optimization problem that considers individualized characteristics of user resource allocation requests of respective ones of the users to obtain potential assignments of respective ones of the users to respective ones of the resources;
   to update one or more game model parameters based at least in part on the solution to the resource allocation optimization problem;
   to update a specified look-ahead function based at least in part on the one or more updated game model parameters;
   to assign the particular user to a particular one of the resources based at least in part on a difference between an updated value of the look-ahead function and a previous value of the look-ahead function, the assigning of the particular user to the particular one of the resources based at least in part on a difference between an updated value of the look-ahead function and a previous value of the look-ahead function comprising assigning the particular user to the particular resource in a manner that maximizes an increase in the updated value of the look-ahead function relative to the previous value of the look-ahead function; and
   to generate one or more control signals based at least in part on the assigning of the particular user to the particular one of the resources;
   wherein the one or more control signals are transmitted by said at least one processing device over a network to a user device of the particular user in order to guide the particular user to the particular resource.

24. The computer program product of claim 23 wherein the look-ahead function comprises a social welfare function that is computed at least in part using:
   a demand function;
   a reward function comprising a product of a designated reward and the demand function;
   dynamic pricing of the resources;
   a performance measure for the system that comprises the resources; and
   a social welfare measure.

25. The computer program product of claim 23 wherein the particular user comprises a user in a group of N users, n=1, 2, . . . N, the users being associated with respective ones of N vehicles, and the designated resources comprise respective ones of M parking facilities, m=1, 2, . . . M, having respective capacities of available parking spaces $c_m$.

* * * * *